US005799322A

United States Patent [19]

Mosher, Jr.

[11] Patent Number: 5,799,322
[45] Date of Patent: Aug. 25, 1998

[54] SYSTEM AND METHOD FOR STOPPING UPDATES AT A SPECIFIED TIMESTAMP IN A REMOTE DUPLICATE DATABASE FACILITY

[75] Inventor: Malcolm Mosher, Jr., Los Gatos, Calif.

[73] Assignee: Tandem Computer, Inc., Cupertino, Calif.

[21] Appl. No.: 790,542

[22] Filed: Jan. 30, 1997

Related U.S. Application Data

[63] Continuation-in-part of Ser. No. 761,725, Dec. 6, 1996, which is a continuation-in-part of Ser. No. 704,111, Aug. 28, 1996, Pat. No. 5,740,433, which is a continuation of Ser. No. 377,152, Jan. 24, 1995, abandoned.

[51] Int. Cl.$^6$ ........................................ G06F 17/30
[52] U.S. Cl. ............... 707/202; 707/201; 707/204; 395/182.14
[58] Field of Search ............... 707/201, 202, 707/204; 395/182.14

[56] References Cited

U.S. PATENT DOCUMENTS 5,740,433   4/1998   Carr et al. ............... 707/202

OTHER PUBLICATIONS

Jorge Guerrero, "RDF: An Overview", Tandem Systems Review, Oct. 1991, pp. 34-43.
Wouter Senf, et al., "RDF Synchronization", Tandem Systems Review, Summer 1992, pp. 6-23.

Primary Examiner—Paul R. Lintz
Attorney, Agent, or Firm—Gary S. Williams; Flehr Hohbach Test Albritton & Herbert

[57] ABSTRACT

A primary computer system has a database, application programs that modify the local database, and a transaction manager that stores audit records in a local audit trail reflecting those application program modifications to the local database. A plurality of parallel backup systems are used to provide "triple contingency protection" of the data on the primary computer system. However, if the primary system suffers a sudden catastrophic failure, the parallel backup systems will generally be left in inconsistent states. To restart the application programs on one of the backup system, the parallel backup are first synchronized with each other, and then transaction processing is restarted with one of the backup systems as the new primary system, and the other backup systems as the backups to the new primary system. In addition, in order to enable any single backup system's database to be brought into a self consistent state, backup volume Updaters are stopped after database updates for all transactions committed on the primary system before a specified time have been completely applied to the backup system's database. After any reports requiring a self consistent database have been generated, operation of the Updaters is resumed.

4 Claims, 30 Drawing Sheets

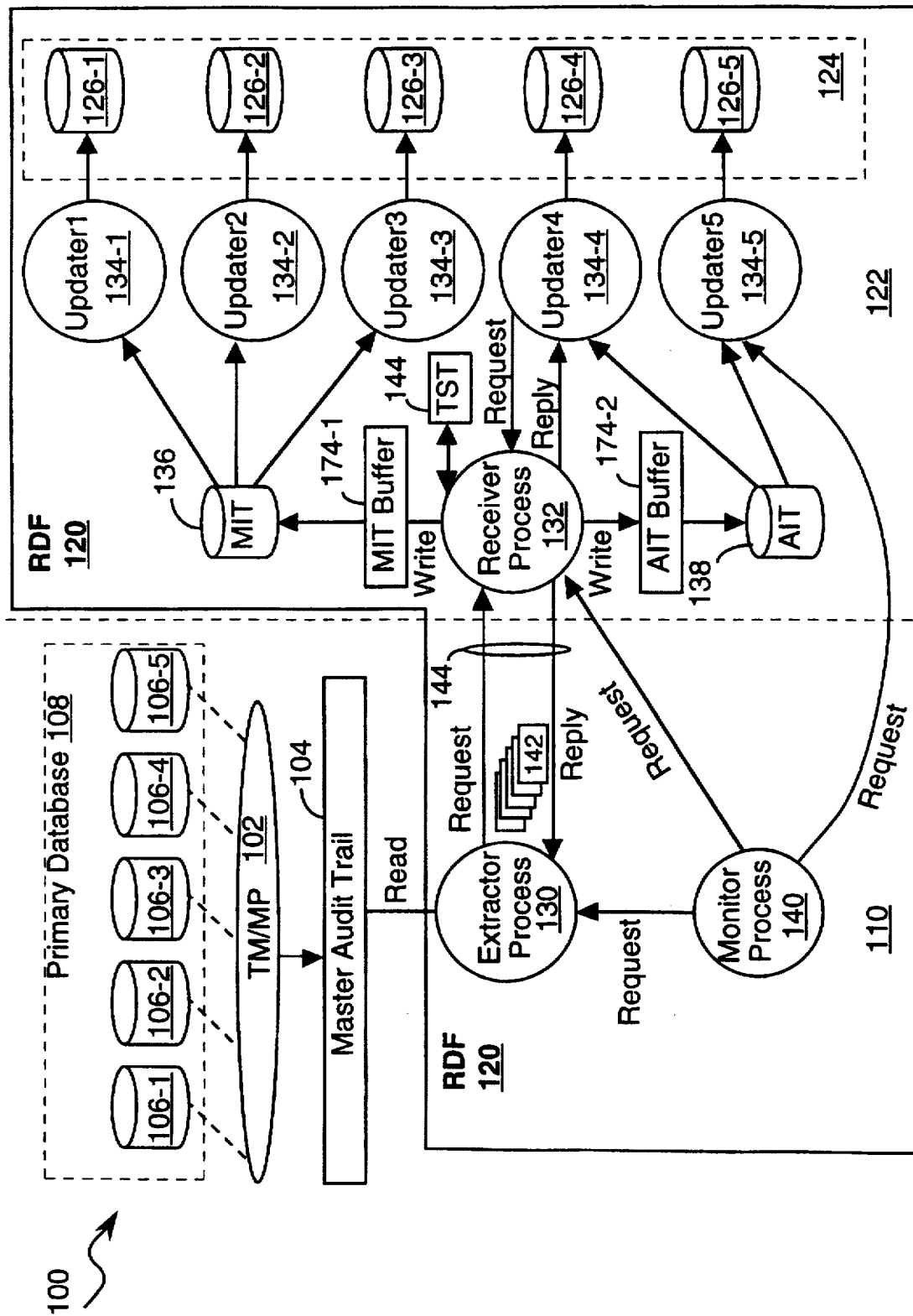
FIG. 1
PriorArt

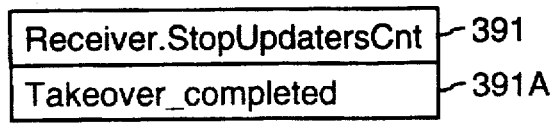
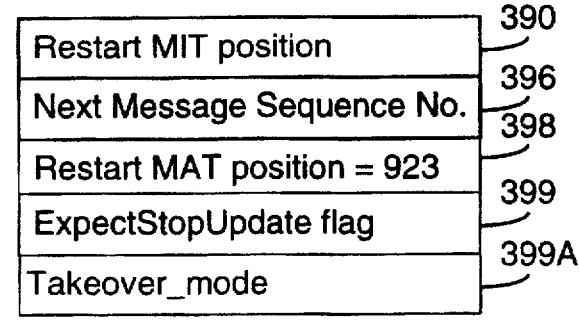
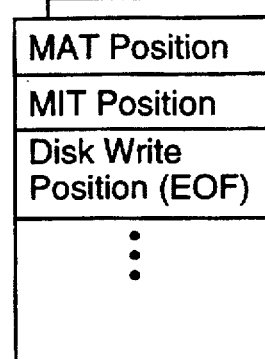
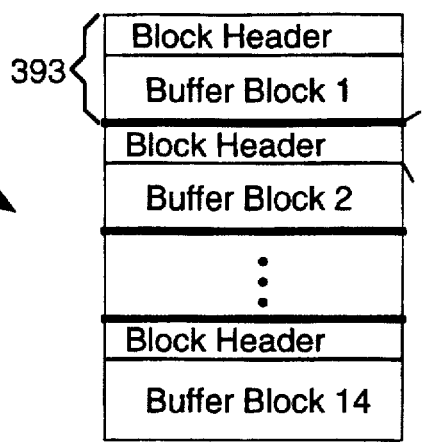
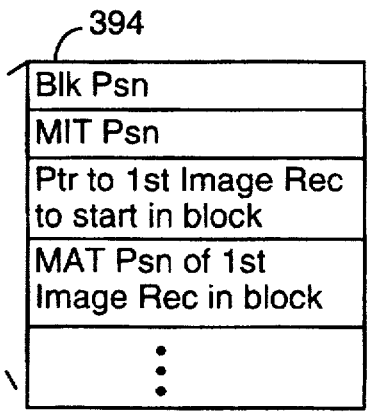

Updater Status Table 400

| Updater | IT File | Current LimitPosition | Last Reported Restart MIT position | Last Reported Restart IT file position |
|---|---|---|---|---|
| 1 | MIT | | | |
| 2 | MIT | | | |
| 3 | MIT | | | |
| 4 | AIT1 | | | |
| 5 | AIT1 | | | |
| ⋮ | ⋮ | ⋮ | ⋮ | ⋮ |

Transaction Status Table (TST) 144

| Trans. ID | Status (Commit or Abort) | MIT Position | Timestamp |
|---|---|---|---|
| S100003 | | 9, 1020 | |
| S100006 | | 9, 1060 | |
| S100004 | | 9, 1080 | |
| ⋮ | ⋮ | | |
| S100256 | | 10, 0020 | |

Stop UPDATERS <timestamp>

[770] Send Stop UPDATE messages to all updaters with an operator specified timestamp.

[772] Each Updater stores the specified timestamp and sets its StopAtTimestamp_mode flag.

FIG. 17A

Operation of Updater while StopAtTimestamp_mode flag is set:

[774] Continue processing image trail records, but:
A) apply updates to the backup volume only if the transaction committed before the specified timestamp;
B) the first time that an update is not applied because the transaction committed at or after the specified timestamp, store that position in the Updater context record as the Timestamp-based Restart Position, and durably store the context record;
C) the first time an image trail record is read having an RTD timestamp at or after the specified timestamp:
- set the crash recovery flag in the Updater's context record,
- set its restart IT position to the Timestamp-based Restart IT Position,
- Set its restart MIT position to the Timestamp-based Restart MIT Position,
- log a shutdown message in the RDF log file, indicating the timestamp, and
- durably save the context record,
- terminate the Updater process.

FIG. 17B

SYSTEM AND METHOD FOR STOPPING UPDATES AT A SPECIFIED TIMESTAMP IN A REMOTE DUPLICATE DATABASE FACILITY

This application is a continuation-in-part of application Ser. No. 08/761,725, now pending, filed Dec. 6, 1996, which was a continuation in part of application Ser. No. 08/704, 111, filed Aug. 28, 1996, now U.S. Pat. No. 5,740,433, which was a continuation of application Ser. No. 08/377, 152, filed Jan. 24, 1995, now abandoned.

The present invention relates generally to database management systems and particularly to a database management system in which a "remote duplicate database facility" monitors changes made to a database on a local system and maintains a copy of that database on a remote system.

BACKGROUND OF THE INVENTION

The purpose of a "remote duplicate database facility" (hereinafter an "RDF") in a database management system (DBMS) is to provide a higher degree of fault tolerance than can be provided through conventional fault tolerance system architectures involving the use of "shadowed" disk storage (i.e., storing all data to two disk storage systems simultaneously) and parallel computers where one computer takes over if the other fails.

In conventional distributed computer systems designed to perform transaction management, one or more transaction managers (i.e., management processes) generate and store transaction audit entries in an audit trail. Most audit entries denote a database table record event, such as an addition, deletion or modification of a specified database table record in a specified database table. Commit/abort audit entries indicate that a specified transaction has committed or aborted. Other audit entries may be used to denote yet other types of transactions, such as transactions involving restructuring of the database tables (e.g., adding an additional alternate index to a database table or changing the number of partitions for a database table), while still other audit entries may denote other events not relevant to this document.

An RDF system monitors the information added to the audit trail so as to monitor changes made to a database on a primary system (often called the "local system" or "primary system"), and maintains a backup copy of that database by applying the same changes to a backup database on a remotely located backup system (often called the "remote system" or "remote backup system"). In this manner the backup database on the remote system is kept continuously up to date by the RDF with changes made to the local system.

The remote system is preferably located sufficiently far from the primary system that even a widespread disaster, such as loss of power over a large geographic area that adversely affects the primary system will not affect the remote system. The use of an RDF system makes it possible to switch business applications from the primary system to the remote backup system in a short period of time, preferably in a matter of minutes. Additionally, if a planned shutdown of the primary system is necessary, business applications can be stopped and immediately restarted on the backup system to access the replicated database.

The present invention addresses two enhancements to the prior art Tandem RDF system. The first improvement improves the usefulness of the data stored on remote backup systems for performing report generation and inquiry tasks.

In particular, it is not uncommon for a remote Tandem RDF system to have a primary system on one continent and the backup system on a second continent. Typically, the second continent is a location where the organization that owns the RDF system also does a substantial amount of business. Instead of using the backup system only for disaster protection, read-only transactions (also called browse access transaction), such as database inquiries are often directed to and performed on the backup system. The data on the backup system is usually only a few seconds less current than the data on the primary system, satisfying timeliness requirements for most data inquiry tasks. All data writing tasks are directed to and processed by the primary system. By using the backup system for inquiry tasks, resources are used more efficiently. The computational load on the primary system is reduced and transcontinental communications for inquiry and response messages is substantially reduced.

Two databases, such as the primary database and a backup database are said to be "synchronized" if they both have identical contents, in terms of data volumes configured for replication on the backup database. Two databases are said to be "virtually synchronized" if in the course of normal operation (i.e., all relevant audit records are being transmitted to the remote backup system) the RDF system can make up for any difference between the two databases.

However, at any particular point in time, if the primary system is in active use and the Updaters on the backup system are in the process of applying redo operations to the backup database, the data volumes on the backup system will not be in a completely consistent state because some transactions will have been partially stored to disk. That is, some of the database updates associated with a transaction may have been committed to disk while others have not. The reason for this is that the Updaters work asynchronously with respect to each other. For instance a single transaction may involve two updates on two different protected volumes. If one of the corresponding Updaters is much further behind than the other, then one of the updates for this transaction will be applied to the backup database long before the other is applied to the backup database, resulting in a backup database that is internally inconsistent. While this "inconsistent state" problem is of no consequence for casual database inquiries, it is intolerable for tasks that require stable access such as generating monthly reports and other important management data summaries that must be totally internally consistent.

Prior to the present invention, if an operator of the RDF system issued a "Stop Updaters" or "Stop RDF" command, the Updater processes would more or less "stop in their tracks", leaving the protected data volumes in the backup system in an inconsistent state. The only way to ensure that the backup system's data volumes were brought to a consistent state was to:

A) stop all transaction activity on the primary system, typically by disabling all the application programs that could perform data modifying transactions;

B) wait for the RDF system to transmit all audit records for all protected volumes to the backup system, and wait for the Updater processes to process all data through the end of their respective image trails; and C) disable the applications programs on the primary systems and then stop TM/MP so that no more audit records are sent to the backup system. When the RDF system catches up to the TM/MP shutdown point, the RDF processes will detect that TM/MP has shut down and will automatically shut themselves down. The transmission of audit records to the backup system can be resumed whenever the backup system no longer needs to be maintained in a consistent state.

The primary problem with this prior art method of bringing the backup system to a consistent state is that it totally disrupts use of the primary system, usually for a period of at least a quarter hour and often much longer.

The present invention provides a methodology for bringing the backup system to a consistent state without having to disrupt operations on the primary system.

A second aspect of the present invention is "triple contingency protection." In some circumstances it is essential that data on a set of protected volumes be protected by a remotely located backup system at all times, even in the rare event of a primary system failure. Thus, if the primary system fails, operations cannot be resumed at the backup system until a new RDF system has been established such that the former backup system is the primary to a new backup system. In order to create this new RDF system one must copy the database from the new primary system to the new backup system in order to have synchronized databases. Depending on the size of the database, this copying operation could take days or even weeks.

The prior art Tandem RDF system did not have any provision for running parallel RDF systems. However, simply supporting the running of parallel RDF systems from one primary system to two backup systems is insufficient. In particular, when running multiple RDF systems, there is no coordination of the activities between the parallel RDF systems and therefore the various backup systems will most likely not have received identical amounts of data and therefore will not be synchronized with each if the primary system fails. For instance, a first RDF system might ship a set of audit information to its backup system just before a primary system failure, while a second RDF system that is running slightly behind the first is prevented from shipping that set of audit information to its backup system due to the primary system failure. As a result, the databases on the two backup systems will not be the same.

In addition, operations cannot be resumed on one of the backup systems with the other systems being used as its backups unless the protected volumes in all those systems are synchronized (i.e., in identical states) with each other. Therefore, having multiple parallel backup systems does not, by itself, provide the functionality required by organizations needing "triple contingency" backup protection, where the triple continency is the failure of two systems (two contingencies) during overlapping time periods (the third contingency).

The most obvious way to synchronize two backup databases that are not already synchronized with each other would be to copy the backup database that is most up to date so as to replace the other backup database. Copying is faster and more efficient than comparing the two databases and making the necessary updates to the database that is less up to date. Unfortunately, the databases on which Tandem RDF systems are used are usually very large, with some databases occupying over 100 Gigabytes of storage. Also, the different backup systems are often located far apart. As a result, copying one backup system's database to another backup system would typically take more than a day, and might well take several days, depending on the communication channel bandwidth available between the two systems. Such a long delay before operations could be resumed on one of the backup systems would be unacceptable in most commercial settings.

The present invention enables the use of parallel RDF systems while avoiding the time consuming database copying problem noted above by providing a methodology for (A) identifying which of the backup systems has the most information (i.e., had received the most audit information from the failed primary system), (B) efficiently synchronizing the protected volumes of all the other backup systems with the identified most up-to-date backup system, usually in just a few seconds, (C) initializing new RDF system definitions for establishing one of the backup systems as the new primary system and the other backup systems as its backups, and (D) resuming operations on the new primary system.

SUMMARY OF THE INVENTION

In summary, the present invention is a distributed computer database system having a local computer system and a remote computer system. The local computer system has a local database stored on local memory media, application programs that modify the local database, and a transaction manager that stores audit records in a local audit trail reflecting those application program modifications to the local database as well as commit/abort records indicating which of the transactions making those database modifications committed and which aborted. Each audit record has an associated audit trail position in the local audit trail, otherwise referred to as a MAT (master audit trail) position.

The remote computer system, remotely located from the local computer system, has a backup database stored on remote memory media associated with the remote computer system.

A remote duplicate data facility (RDF) is partially located in the local computer system and partially in the remote computer for maintaining virtual synchronization of the backup database with the local database. The RDF includes an Extractor process executed on the local computer system, and a Receiver process and one or more Updater processes executed on the remote computer system.

The Extractor process, executed on the local computer system, extracts audit records from the local audit trail. It has a plurality of message buffers (four in the preferred embodiment) for buffering groups of the extracted audit records together and transmits each message buffer to the remote computer system when the buffer is full or a timeout occurs.

The Receiver process, executed on the remote computer system, receives message buffers transmitted by the Extractor process and distributes the audit records in each received message buffer to one or more image trails in the remote computer system.

Each Updater process, executed on the remote computer system, reads the audit records in an assigned image trail and initiates redo operations against the backup database for each audit record corresponding to a transaction successfully committed on the primary system.

In systems having a plurality of RDF systems running in parallel so as to provide "triple contingency protection" of the data on a primary computer system, the RDF systems will, in general, not be synchronized with each other. As a result, if the primary system suffers a sudden catastrophic failure, the databases on the parallel backup systems will not be synchronized with each other. The present invention provides a methodology for synchronizing the databases of the parallel backup systems after a failure of the primary system, and for then restarting transaction processing with one of the backup systems as the new primary system, and the other backup systems as the backups to the new primary system.

The databases of the parallel backup systems are synchronized by (A) identifying which of the backup systems has the most information (i.e., had received the most audit information from the failed primary system), (B) synchronizing the protected volumes of all the other backup systems with the identified most up-to-date backup system as efficiently as possible, (C) initializing new RDF system definitions for establishing one of the backup systems as the new primary system and the other backup systems as its backups, and (D) resuming operations on the new primary system.

In addition, in order to enable any single backup system's database to be brought into a self consistent state, the present invention provides a methodology for stopping the Updaters after the database updates for all transactions that were committed on the primary system before a specified time have been completely applied to the backup system's database. After this Updater stop operation has been performed, reports can be generated using the backup system's database with assurance that the information in the backup system's database is self consistent. After the reports requiring a self consistent database have been generated, operation of the Updaters is resumed.

BRIEF DESCRIPTION OF THE DRAWINGS

Additional objects and features of the invention will be more readily apparent from the following detailed description and appended claims when taken in conjunction with the drawings, in which:

FIG. 1 is a block diagram of a prior art database management system with a remote duplicate database facility.

FIGS. 7A is a block diagram of a Receiver context record. FIG. 7B is a block diagram of a set of image trail context records. FIGS. 7C–7G are block diagrams of data structures used by the Receiver process in a preferred embodiment of the present invention.

FIGS. 17A and 17B depict flow charts of the Stop Updaters at Timestamp procedure used in a preferred embodiment of the present invention.

DESCRIPTION OF THE PREFERRED EMBODIMENTS

Overview of RDF System

Figure 2:
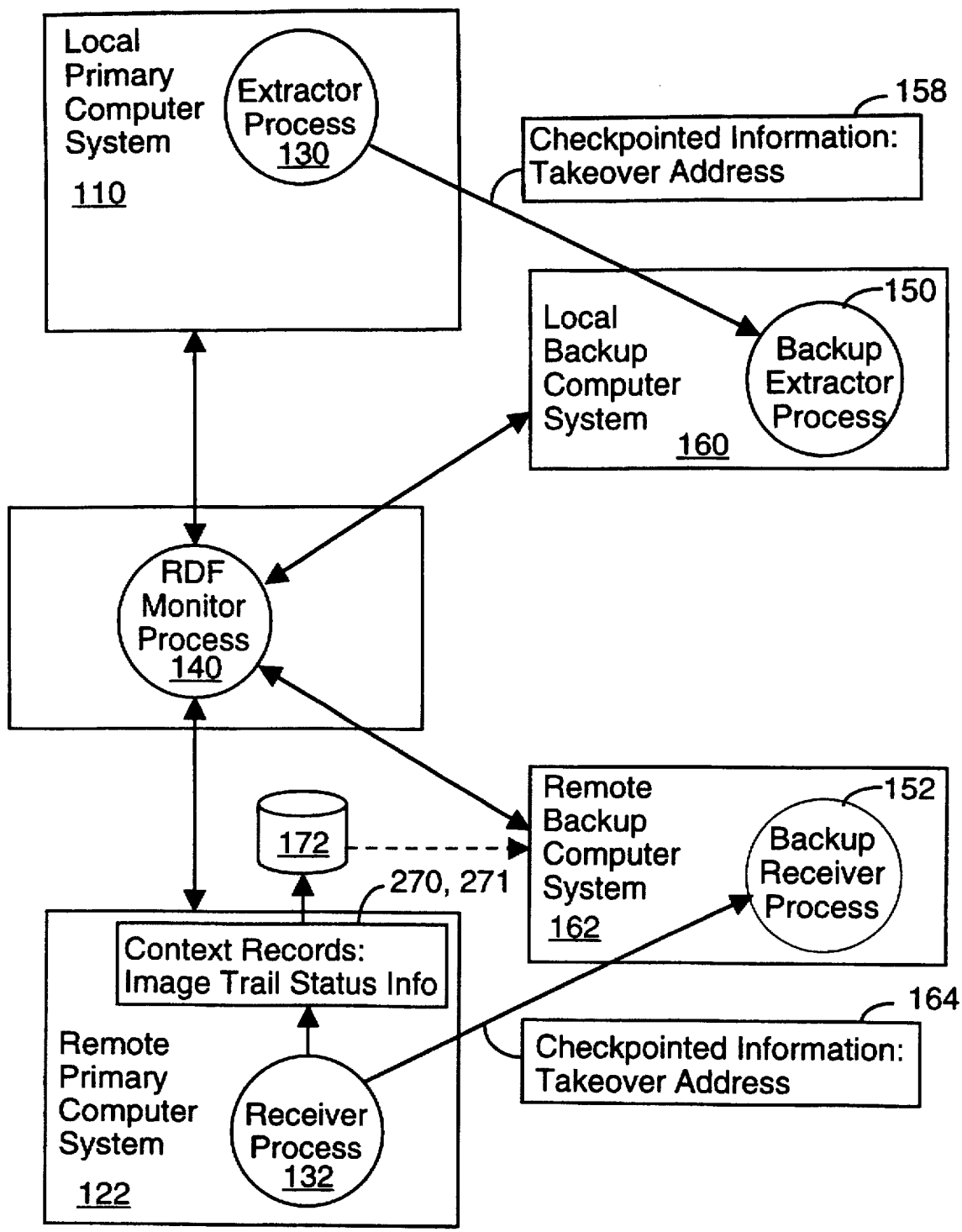
FIG. 2 is a conceptual representation of the checkpoint, context save, and failover procedures used by the system shown in FIG. 1.

FIG. 1 represents the basic architecture of Tandem Computer's RDF system prior to the present invention, while FIG. 2 shows the relationship between some of the RDF processes and their respective local backup processes. In Tandem transaction processing systems each process has a respective local backup process which is automatically invoked if the primary process fails. Each local backup process is located on a different CPU than its respective primary process, and provides a first level of fault protection. A primary purpose of the RDF (remote data facility) system is to handle failures in the primary system that cannot be resolved through the use of local backup processes (and other local remedial measures), such as a complete failure of the primary system.

The computer system 100 shown in FIG. 1 has a transaction management facility 102 that writes audit entries to a master audit trail (MAT) 104. The audit entries indicate changes made to "audited files" on "RDF protected volumes" 106 of a primary database 108 on a primary system 110. All RDF protected volumes are configured to write all transaction audit records to the MAT 104.

The RDF system 120 includes processes on both the primary (local) computer system 110 and a remote backup computer system 122. The RDF 120 maintains a replicated database 124 (also called the backup database) by monitoring changes made to "audited files" on "RDF protected volumes" 106 on a primary system and applying those changes to corresponding backup volumes 126 on the backup computer system 122. An "audited file" (sometimes called an "RDF audited file") is a file for which RDF protection has been enabled, and an "RDF protected volume" is a logical or physical unit of disk storage for which RDF protection has been enabled.

On the primary computer system 110, an RDF Extractor process 130 reads the master audit trail (MAT) 104, which is a log maintained by the transaction management facility (TM/MP) of all database transactions that affect audited files, and sends any audit records associated with RDF-protected volumes to an RDF Receiver process 132 on the backup computer system.

The MAT 104 is stored as a series of files with sequentially numbered file names. The MAT files are all of a fixed size (configurable for each system), such as 64 Mbytes. The TMF 102 and Extractor 130 both are programmed to progress automatically (and independently) from one MAT file to the next.

The Extractor Process—Overview

The Extractor process 130 adds a timestamp to each audit record that it extracts from the master audit trail 104 and determines is for a protected volume. This timestamp is known as the RTD timestamp. The added timestamp is the timestamp of the last transaction to complete prior to generation of the audit record in the MAT 104. The resulting record is called an audit image record, or image record. The Extractor process stores each audit image record in message buffers 142, each having a size of about 28K bytes in the preferred embodiment.

The Extractor process uses two to eight message buffers 142, with four message buffers being a typical configuration. After filling and transmitting a message buffer 142 to the Receiver process via a communication channel 144, the Extractor process 130 does not wait for an acknowledgment reply message from the Receiver process 132. Rather, as long another message buffer is available, it continues processing audit records in the MAT 104, storing audit image records in the next available message buffer 142. Each message buffer 142 is made unavailable after it is transmitted to the Receiver process 132 until a corresponding acknowledgment reply message is received from the Receiver process 132, at which point the message buffer 142 becomes available for use by the Extractor process 130.

The Extractor process 130 performs a single checkpoint operation during startup of the Extractor process, and that checkpoint 158 only sends a takeover location to the backup Extractor process 150. (See FIG. 2.) It also does not durably store a context record. Rather, the Extractor process 130 instead relies on information received from the Receiver process 132 when RDF is either starting up or restarting, as will be explained in more detail below, as well as during an RDF startup.

The Receiver Process—Overview

The Receiver process 132 immediately acknowledges each received message buffer. No processing of the message buffer is performed before the acknowledgment is sent. The RDF system provides tight synchronization of the Extractor and Receiver processes and provides for automatic resynchronization whenever a start or restart condition occurs. For example the two processes will resynchronize whenever either process is restarted or has a primary process failure, and whenever the Receiver process receives audit records out of order from the Extractor process.

The Receiver process 132 sorts received audit records such that (A) commit/abort records are stored only in the master image trail 136, and (B) each database update audit record is moved into only the one image trail 136, 138 corresponding to the only Updater process 134 that will potentially use that audit record to update data stored on a backup volume 126.

The Receiver process includes a separate "double buffer" for each image trail. In the preferred embodiment, each image trail has two 56K byte buffers that are used in alternating fashion. Each image trail buffer 174 is structured as fourteen blocks of length 4K bytes.

The Receiver process 132 writes commit/abort records received from the Extractor to the master image trail 136. Additionally, it stores data indicating the outcome of each transaction, i.e., commit or abort, to a transaction status table (TST) 144. Thus the Receiver can access the TST 144, which is stored in memory, to determine the status of each transaction that has either committed or aborted without having to access records in the master image trail, which is stored on disk.

Whenever the Receiver process receives a special "Stop Updaters" audit record, it copies that record into all the image trails. The Stop Updaters audit record, produced on the primary system 110 by special "online DDL" procedures, causes each Updaters 134 to stop. Each Updater logs a message indicating that it has shut down because it read a particular Stop Updaters record. When all the Updaters have shut down in response to the same Stop Updaters record, the operator of the RDF should (A) perform the same DDL procedure on the remote backup system as was performed by the online DDL procedure and then (B) to re-start the Updaters. This procedure is used to ensure continued virtual synchronization of the local and remote database when "online DDL" procedures are used to restructure database objects on the primary system with minimal interruption of user access to the database objects being restructured.

The Receiver process performs a single checkpoint operation during startup of the Receiver process, and that checkpoint 164 only sends a takeover location to the backup Receiver process 152. (See FIG. 2.) However, it does periodically (e.g., once every 5 to 25 seconds) durably store a Receiver context record 270 and a set of Image Trail context records 271 on a nonvolatile (disk) storage device 172 (see FIGS. 7A and 7B). The context records 270, 271 stored by the Receiver process 132 are quite small, consisting primarily of a few values for each image trail.

Updater Processes—Overview

Each RDF-protected volume 106 on the primary computer system 110 has its own Updater process 134 on the backup computer system 122 that is responsible for applying audit image records to the corresponding backup volume 126 on the backup computer system 122 so as to replicate the audit protected files on that volume. Audit image records associated with aborted transactions on the primary system are never applied to the database on the remote backup computer system 122.

The audit image records in each image trail 136, 138 are typically read and processed by two to ten Updaters 134. Each Updater 134 reads all the audit image records in the corresponding image trail, but utilizes only the audit image records associated with the primary disk volume 106 for which that Updater is responsible.

Since the Updaters 134 only initiate redo operations on the audit image records for transactions that have committed, the Updaters 134 require the transaction status information in the transaction status table 144. To obtain that information, each Updater 134 requests transaction status information from the Receiver process 132 whenever it reads an audit image record for a database table that the Updater is assigned to replicate and for which the transaction status is unknown to the Updater. The Receiver process 132, in response to each status request, sends the requesting Updater process 134 a message that includes not only the status of the transaction identified in the status request, but also the status of the next two hundred or so transactions in the transaction status table 144 that completed after the identified transaction. If the Receiver process 132 does not yet know the status of the identified transaction, it does not respond to the status request until it receives a commit/abort record concerning the identified transaction.

At periodic intervals, each Updater flushes database updates to disk, and durably stores its current image trail position and an associated master image trail position to disk in a context record. The saved image trail position, called the Restart IT position, indicates that the Updater has no further need for image trail records at earlier positions.

As each Updater process reads a new block of image data, it extracts from the block's header a master image trail (MIT) position. Whenever an Updater process sends a request to the Receiver process, it reports to the Receiver process the Restart MIT position and the Restart image trail file position in the Updater's last durably stored context record.

The reported Restart MIT position is used by the Receiver process 132 to determine which portions of the transaction status table 144 are no longer needed and thus can be discarded. The reported Restart MIT position is also used to determine which MIT files can be discarded. The reported image trail position is used by the Receiver process 132 to determine which image trail files have been processed by all the Updaters assigned thereto and thus can be deleted.

When an Updater process 134 reaches the end of file of the image trail 136,138 to which it is assigned, it performs a wait for a preselected amount of time, such as two to ten seconds before attempting to read more audit image records.

Monitor Process—Overview

Monitor process 140 and another process called RDF-COM (which will be collectively referred to as the Monitor for the purpose of this document) are is used to coordinate tasks performed in response to user commands to the RDF system.

RDF Configuration File

Figure 3:
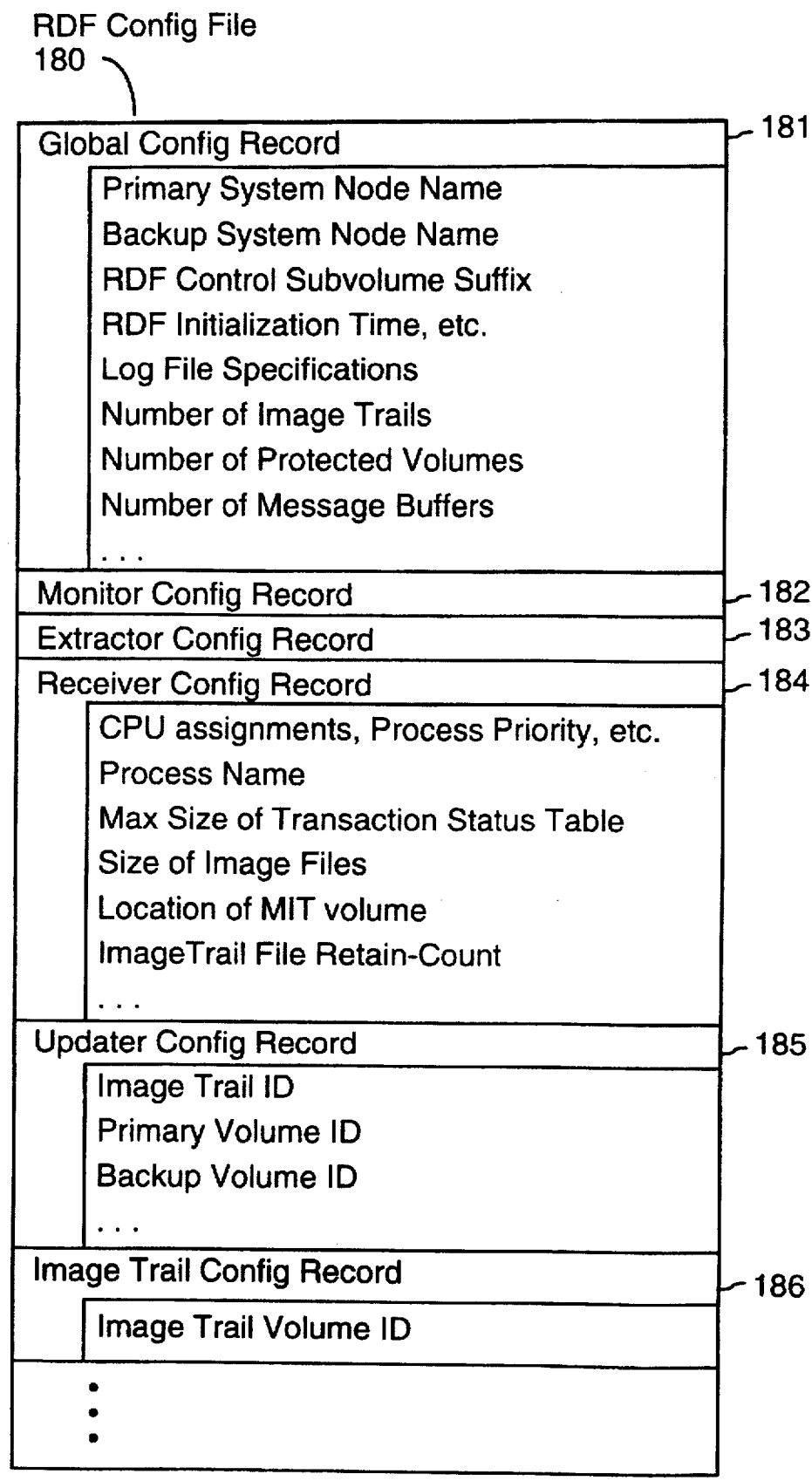
FIG. 3 is a schematic representation of the configuration file used to define the configuration of each RDF system in a preferred embodiment.

Referring to FIG. 3, the structure of each RDF system 120 is represented by a configuration file 180 that is stored on the control volume of the primary system 110 and the control volume of the backup system 122 associated with the RDF system. The RDF configuration file 180 includes one global RDF configuration record 181; one Monitor configuration record 182 for identifying characteristics of the RDF system's Monitor process; one Extractor configuration record for 183 for identifying characteristics of the RDF system's Extractor process; one Receiver configuration record 184 for identifying characteristics of the RDF system's Receiver process; one Updater configuration record 185 for each of the RDF system's Updaters, for identifying characteristics of the corresponding Updater process; and one Image Trail configuration record 186 for each image trail in the backup system.

The information stored in the global RDF configuration record 181 includes:
the node name of the primary system;
the node name of the backup system;
the control subvolume used by the RDF system;
the time that the RDF system was initialized;
the name and location of the RDF system's log file;
the number of image trails in the backup system;
the number of protected volumes, which is also the number of Updaters in the backup system;
the number of message buffers used by the RDF system; and other information not relevant here.

Each of the process configuration records 182–185 includes information identifying the CPUs on which that process and its backup runs, the priority assigned the process, the name of the process, and so on. In addition, the Receiver configuration record 184 also specifies the maximum size of the transaction status table (which is described below), the size of each of the image trail files, the volume used to store the master image trail files, and a parameter called the image trail retain count, which indicates the number of image trail files to be retained for each image trail.

The Updater configuration records 185 each identify the image trail from which the associated Updater process is to read audit information, the primary volume whose audit information is to be processed by the Updater, and the backup volume to which database updates are to be applied by the Updater.

Each Image trail configuration record 186 identifies the disk volume on which the image trail files for the corresponding image trail are to be stored.

Using Parallel RDF Systems—Overview

Figure 4:
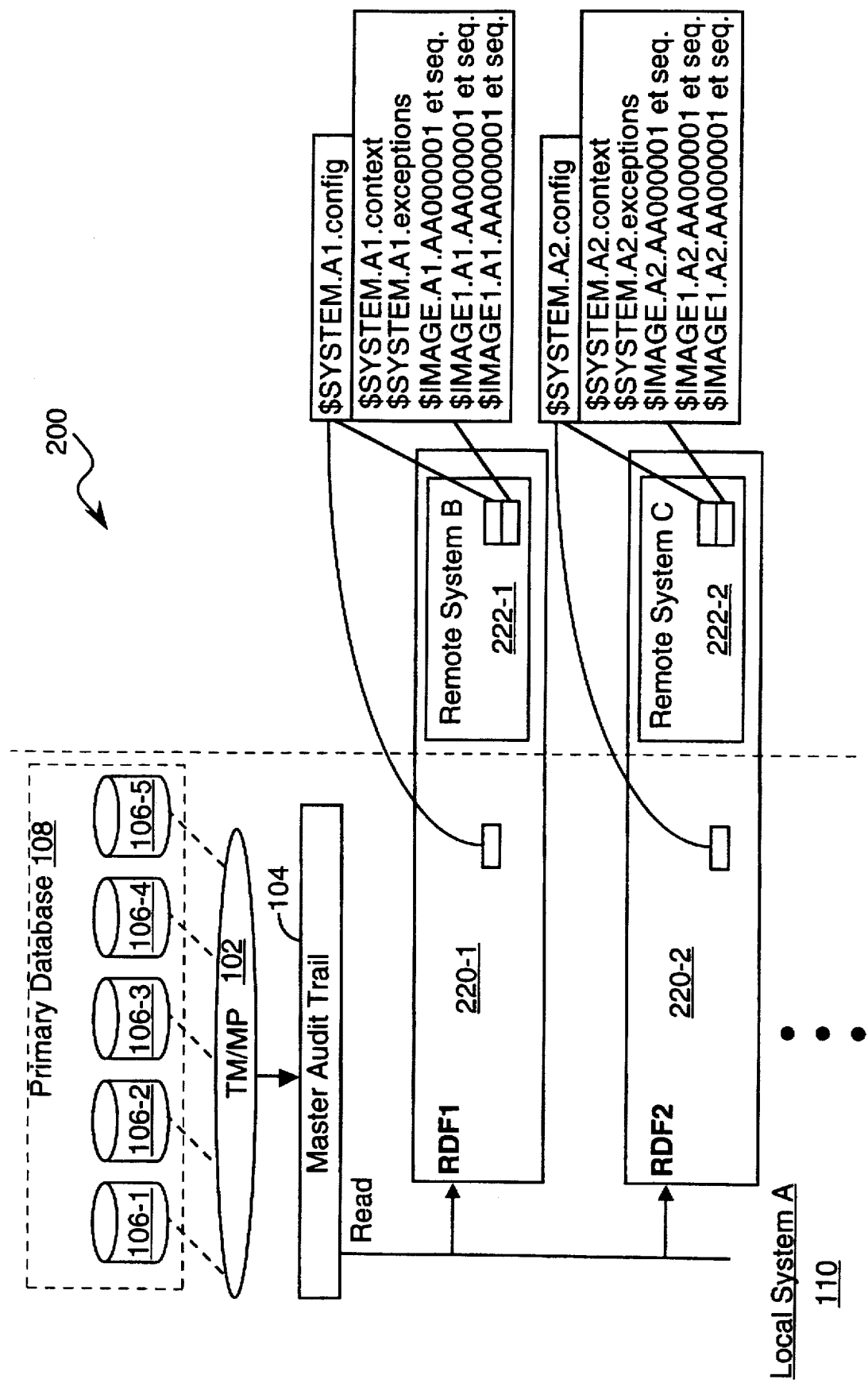
FIG. 4 is block diagram of a database management system having a plurality of parallel remote duplicate database facilities.

Referring to FIG. 4, there is shown a system in which data volumes 106 on a primary system 110 are protected by two or more parallel RDF systems 220. Each RDF system 220 contains its own copy of all the processes and data structures shown in FIG. 1 for a single RDF system 120.

Identical copies of the entire configuration file for each RDF system are stored on the primary and backup systems, while the context, exceptions and image files are only on the backup system.

Having multiple backup copies of a database is especially useful in at least two commercial settings:

1) Applications that perform intensive read only queries. A classic example of this would be a telephone billing system in which billing database updates are performed on the primary system and telephone directory inquiries are performed on the backup system.

2) Applications in which "triple contingency" protection is required. The relevant triple continency is the failure of the primary database system and one remotely located backup system (two contingencies) during overlapping time periods (the third contingency). In particular, in such applications, it is unacceptable to run applications on a single backup system after a catastrophic failure of the primary system. Rather, it is required (A) that the primary system have at least two parallel backup systems, (B) after losing the primary system, one backup system is set up as the new primary system, (C) another backup system is set up as the backup to the new primary system, and (D) a new RDF system is established to replicate data from the new primary system onto that other backup system. Thus data on the primary system, even when it is actually a former backup system, is always protected by at least one RDF system. Examples of systems where triple contingency protection may be required are large banking systems, or a national monetary transaction or clearing house system.

Having a single RDF system configured to replicate databases across multiple backup systems is not practical for a number of reasons. For example, the Extractor process would be required to ship an audit buffer to multiple backup systems. But if the communication path to even one of the backup systems went down, either the Extractor system would have to cease shipping audit information to all the backup systems until the communication path problem were solved, or it would need to keep track of what audit information had been shipped to each of the backup systems (which would be inefficient). As a result, when multiple backup systems are needed, multiple RDF systems 220 with a common primary node are used.

In order to keep track of the locations of the files used by each of the parallel RDF systems 220, the following file naming convention is used in a preferred embodiment. The "pathname" of each RDF system's configuration file is preferably of the form "$SYSTEM.xxx.config" where $SYSTEM is the always the name of the control volume of any node in the system 100, "config" identifies the file as an RDF configuration file, and "xxx" is a "subvolume" name that uniquely identifies the RDF system 120. When a primary system 110 is protected by more than one RDF system, each of those RDF systems will have a different subvolume name. In the preferred embodiment, the subvolume name assigned to each RDF system is composed of the node name of the primary system and a one alphanumeric (e.g., 1, 2, . . . or any letter) character subvolume suffix. For instance, if the node name of the primary system 110 is "A", and two parallel RDF systems are used, their respective config files would likely be named $SYSTEM.A1.config and $SYSTEM.A2.config. As shown in FIG. 4, similar file naming conventions are used for the context file, exceptions file and image files of each RDF system 220, as explained above. Each RDF system's context file stores all the context records for that system. Each time a context record is durably stored, that record is stored in the context file on disk. The exceptions files and image files are discussed in more detail below. In the preferred embodiment, image trails are stored on user selected volumes, which are different than the control volume $SYSTEM, but they still use the same "xxx" control subvolume name as the corresponding configuration and context files.

It should be noted that the RDF configuration, context and Exceptions files previously stored on a backup system's control subvolume (e.g., $SYSTEM.A1) must be deleted before a new RDF configuration using the same backup system can be initialized. The RDF system will automatically purge any old image trail files when a new RDF system is first started.

Detailed Explanation of Extractor Process

Figure 5A:
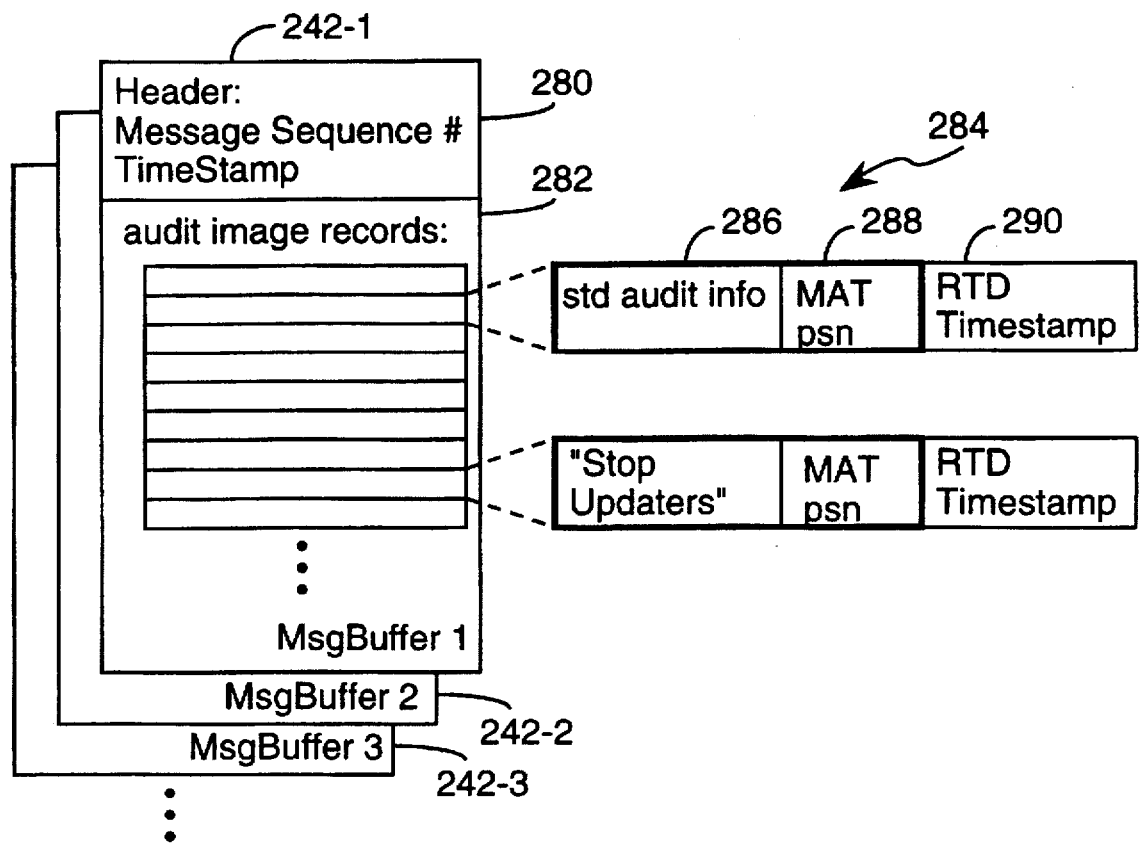
FIGS. 5A and 5B depict data structures used by the Extractor process in a preferred embodiment of the present invention.
Figure 5B:
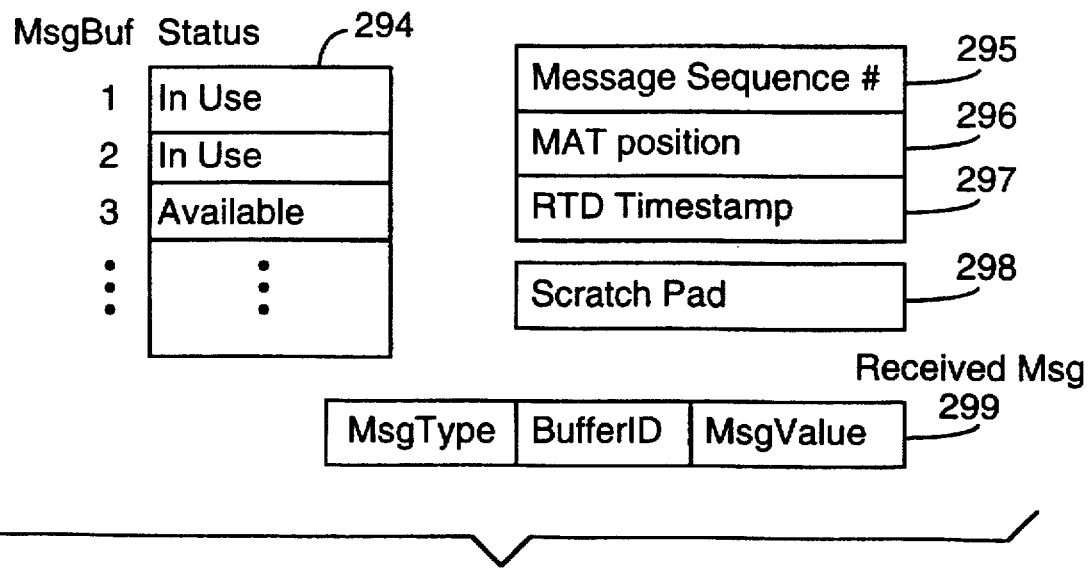

Referring to FIGS. 5A and 5B, the primary data structures used by the Extractor process 130 are as follows. As stated earlier, the Extractor process 130 utilizes two or more message buffers 142. A portion of each message buffer 142 is used to store a "header" 280, which includes (A) a message sequence number and (B) a timestamp. The body 282 of the message buffer 142 is used to store audit image records 284. Each audit image record 284 includes an audit information portion 286, a MAT position value 288 and a RTD (relative time delay) timestamp value 290. The audit information portion 286 is copied from the audit record in the MAT 104, while the MAT position 288 of the audit record and RTD timestamp field 290 are added by the Extractor process to create an "audit image record" 284.

The audit information portion 286 consists of the standard information found in audit records in the MAT 104, such as before and after field values for a modified row in a database table, or a commit/abort indication for a completed transaction. Other audit records in the MAT that are relevant to this document are "Stop Updaters" audit records and "flush control point" audit records.

The Extractor process 130 also maintains a message buffer status table 294, which indicates for each message buffer whether that buffer is available for use, or not available because it is currently in use by the Extractor. In addition, the Extractor process 130 maintains a message sequence number in register 295, a MAT file pointer in register 296, a local timestamp value in register 297, and a scratch pad 298 in which it stores audit image records that it is currently processing.

Finally, the Extractor process 130 includes a data structure 299 for storing reply messages received from the Receiver process 132. This data structure includes a first field indicating the type of message received, which is equal to either "message buffer acknowledgment" or "resynch reply", a message buffer identifier, and a "message value" field. The message value field is equal to a MAT position value when the message type is "resynch reply," and is equal to either an "OK" or "Error" condition code when the message type is "message buffer acknowledgment."

Referring to FIGS. 6A–6E, the Extractor process 130 works as follows.

The Extractor Startup Procedure 300 is called whenever the Extractor process 130 or its backup starts up, as in the case of a failover or a transfer of control back to the primary Extractor process 130 from the backup Extractor process. The Startup procedure begins by performing a "static initialization" of the Extractor process (302), which means that all static data structures used by the Extractor process are allocated and initialized. While initializing static data structures, the Extractor process reads information denoting the set of RDF protected objects from the configuration file, and builds an internal table of RDF protected disk volumes. This table is used later as an audit record filter, such that audit records for non-RDF protected volumes are ignored by the Extractor process. The startup procedure then creates a backup process (304). Then a checkpoint operation is performed in which a takeover location is transmitted to the backup Extractor process (306). The takeover location is, in essence a program address, and in the preferred embodiment the takeover location is the program location at which execution of the volatile initialization procedure 310 begins. Finally, the Extractor Startup procedure calls (308) the Extractor Volatile Initialization procedure 310.

The Extractor Volatile Initialization procedure 310 is called during startup by the Extractor Startup procedure 300, when the Extractor receives an Error reply message from the Receiver, and whenever there is an Extractor process failure. The Extractor Volatile Initialization procedure begins by allocating and initializing all volatile data structures used by the Extractor process, including message buffers 142, the message buffer status array 295 (312), and the message sequence number (which gets initialized to an initial value such as 1). Then the Extractor Volatile Initialization procedure transmits a Resynchronization Request message to the Receiver process (314) and waits for a Resynch Reply message (316). The Resynch Reply message will contain a MAT position value, which the Extractor Volatile Initialization procedure moves (318) into the MAT position MATpsn 296. Finally, the Extractor Volatile Initialization procedure calls (320) the main Extractor procedure 330.

The Main Extractor procedure 330 begins by initializing and starting a timer called the Message Timer (MsgTimer) (332). The Message Timer is typically programmed to expire in one second, although the timeout period is configurable to virtually any value. Next, the Extractor procedure reads a record in the MAT (334). If the MAT record is an audit record for an RDF protected volume, a commit/abort record for any transaction, a "Stop Updaters" record, or a flush control point record, the audit record is modified by adding the MAT position of the current audit record to the audit image record and by adding an RTD timestamp to the audit image record (336). The added RTD timestamp is the timestamp of the last transaction to complete prior to generation of the audit image record in the MAT 104. Every time the Extractor procedure encounters a commit or abort audit record, it moves a copy of the timestamp in that record into its local timestamp register 297. The value in the local timestamp register 297 is the RTD (relative time delay) timestamp that is added to audit records so as to generate an audit image record, also known as an image record.

If the message buffer currently in use has room for the resulting audit image record (338) it is moved into the message buffer (340). Then the Extractor procedure continues processing the next record in the MAT at step 334.

If the message buffer currently in use is full (338), the values stored in the message sequence number register 295 and the timestamp register 297 are inserted into the Message Buffer's header 280 (342). The Extractor procedure then transmits the message buffer to the Receiver process (344). After transmitting the message buffer, the Message Buffer Status array 294 is updated to indicate that the message buffer just transmitted is not available for use. In addition, the Message Timer is cleared and restarted, and the Message Sequence Number in register 295 is increased by one (346). Finally, the audit image record that did not fit in the last message buffer is moved into the next available message buffer (348). If a next message buffer is not available, the Extractor procedure waits until one becomes available and then moves the audit image record into it. Then the Extractor procedure continues processing the next record in the MAT at step 334.

When the audit record read (334) from the MAT 104 is not an audit record for an RDF protected volume, is not a transaction commit/abort record, is not a "Stop Updaters" record and is not a flush control point record for a protected RDF volume, the audit record is ignored and the next audit record (if any) in the MAT is read (334).

Figure 6A:
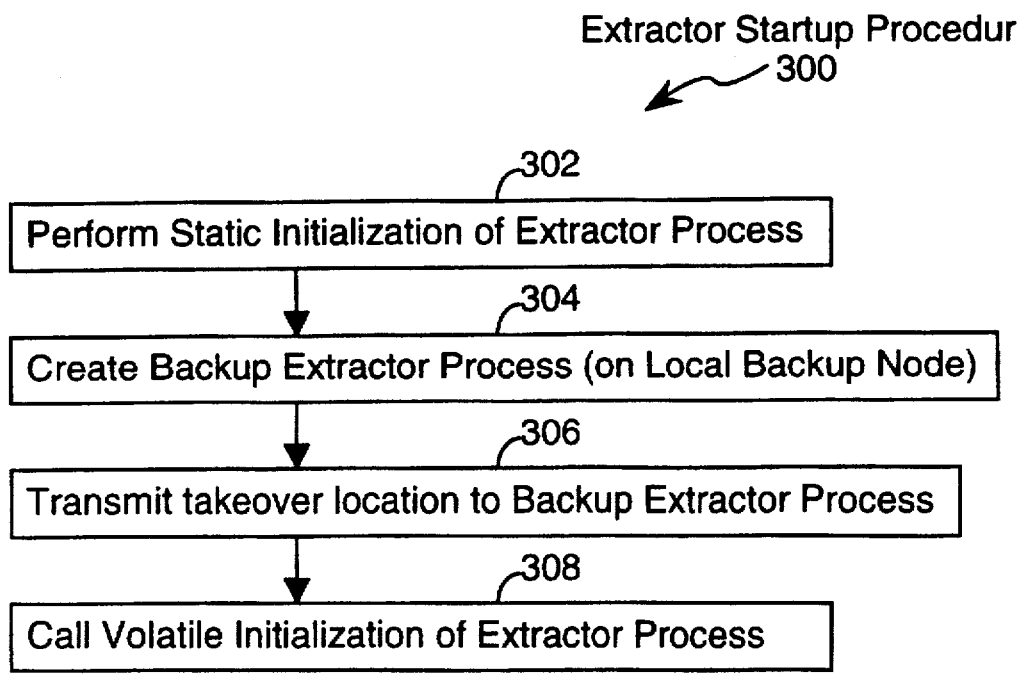
FIGS. 6A–6E are flowcharts of procedures executed by the Extractor process in a preferred embodiment of the present invention.
Figure 6B:
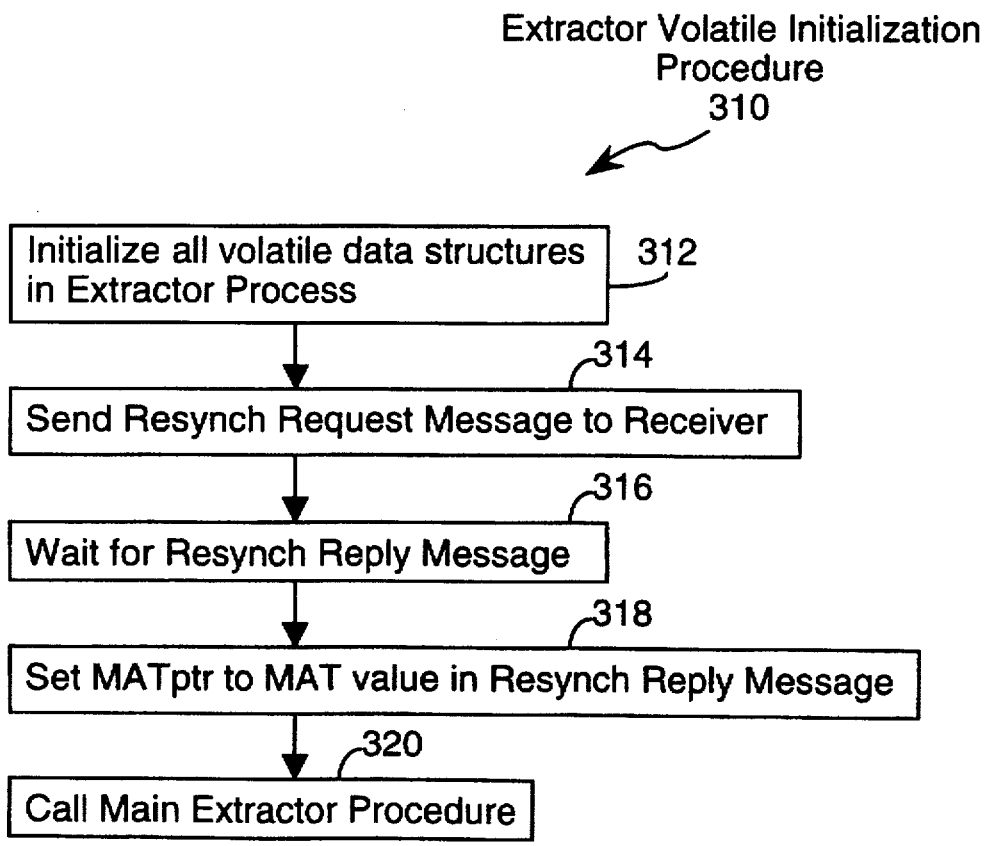
Figure 6C:
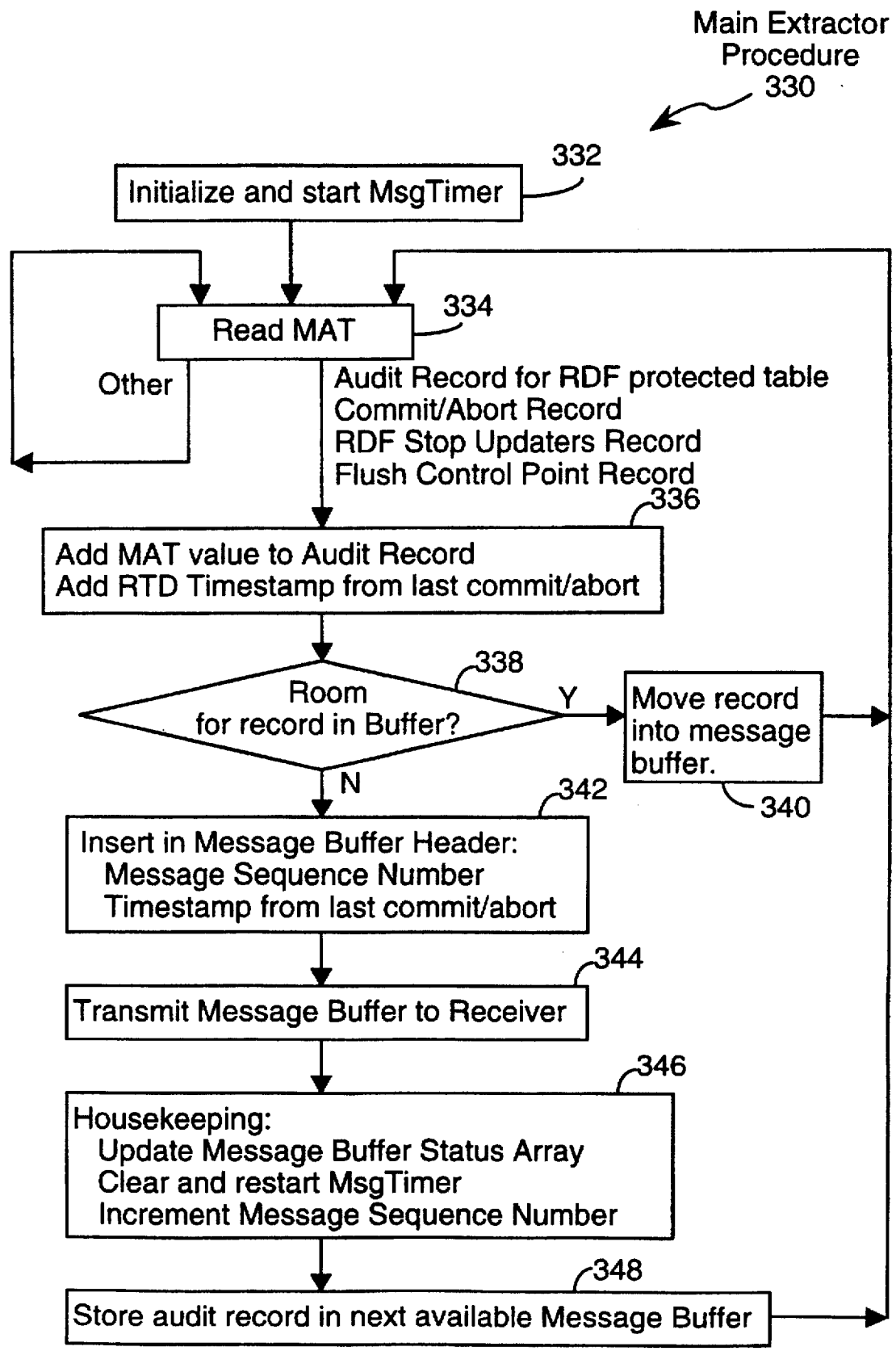
Figure 6D:
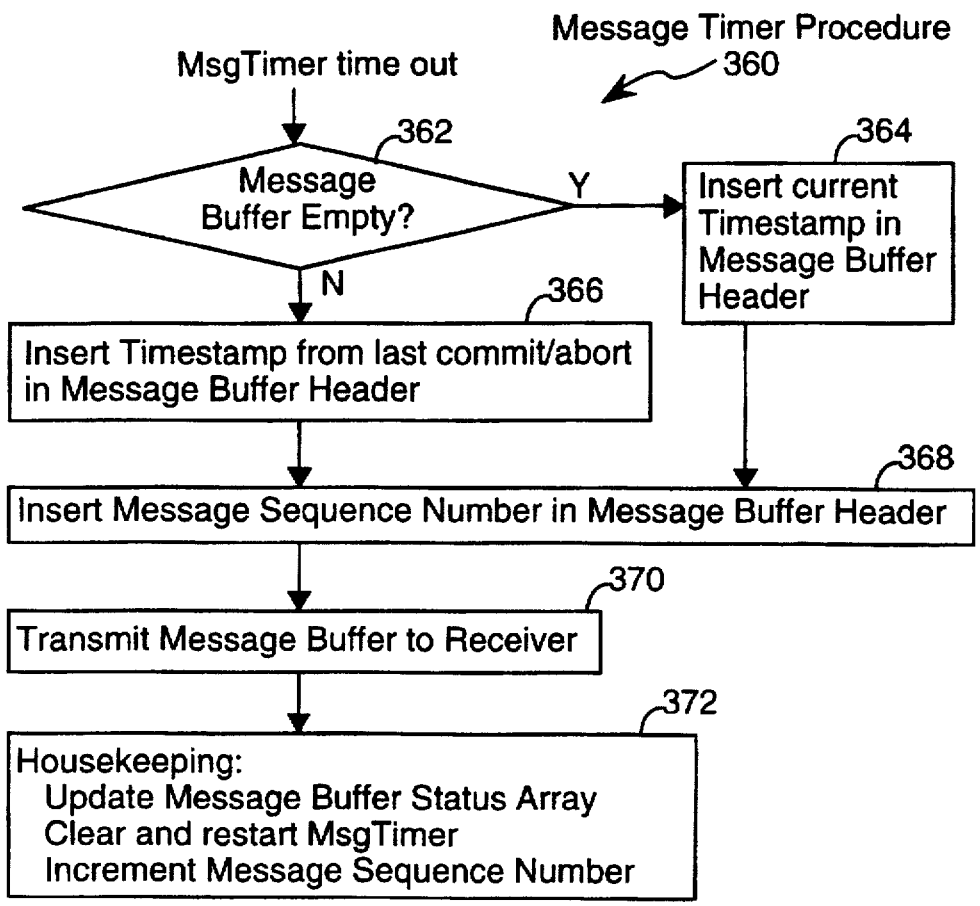
Figure 6E:
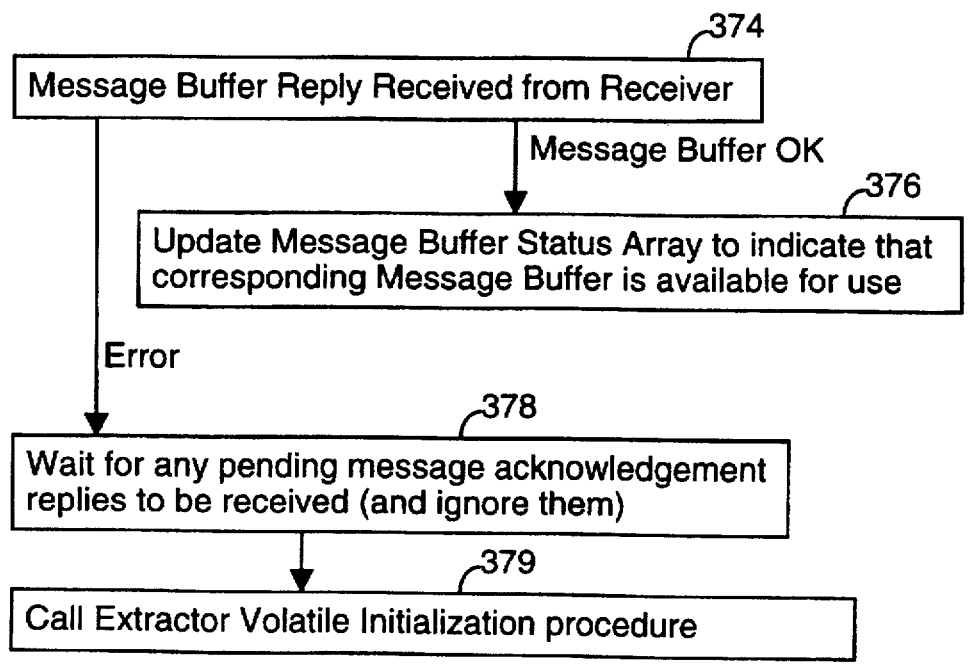

The purpose of the Message Timer is to ensure that audit image records are transmitted to the Receiver process in a timely fashion, even when the rate at which audit records are generated for RDF protected files is low. Referring to FIG. 6D, when the Message Timer times out the Message Timer procedure 360 first checks to see if the current Message Buffer is empty (i.e., contains no audit image records) (362). If so, a timestamp indicative of the current time is inserted into the Message Buffer header 280 (364). If not, the timestamp value from the last commit/abort record, stored in RTD timestamp register 297, is inserted into the Message Buffer header (366). Then the current Message Sequence Number is inserted in the Message Buffer header (368) and the Message Buffer is transmitted to the Receiver (370). After transmitting the message buffer, the Message Buffer Status Array 294 is updated to indicate that the message buffer just transmitted in not available for use, the Message Timer is cleared and restarted, and the Message Sequence Number in register 295 is increased by one (372).

When the Extractor process receives a reply from the Receiver process acknowledging receipt of a message buffer (374), if the reply message indicates the message buffer was received without error, the Message Buffer Status Array 294 is updated to indicate that the message buffer identified in the reply message is available for use (376).

If the reply message received by the Extractor process from the Receiver process indicates that the Extractor must restart, then the Extractor and Receiver must resynchronize with each other. The Receiver process tells the Extractor process to restart whenever (A) a message with an out-of-sequence Message Sequence Number is received, and (B) whenever the Receiver process starts up after a failover or return of control back to the primary Receiver process from the backup Receiver process (sometimes called a CheckSwitch). When the Extractor process receives an error condition reply message from the Receiver process that indicates the need to resynchronize, it waits for any pending message acknowledgment replies to be received for any other message buffers transmitted prior to receipt of the error condition reply message, and it ignores those reply messages (378). Then the Extractor process calls the Extractor Volatile Initialization procedure (379) so as to resynchronize the Extractor process with the Receiver process.

Detailed Description of Receiver Process

The primary data structures used by the Receiver process 132 in the preferred embodiment are shown in FIGS. 7A–7G. As stated earlier, the Receiver process durably stores a Receiver context record 270 and a set of Image Trail context records 271 on a nonvolatile (disk) storage device 272 on a periodic basis. The Receiver context record 270 includes a Receiver.StopUpdatersCnt count value 391, and a Takeover_Completed flag 391A (used to indicate when an RDF takeover operation has been completed). Each image trail's context record 271 includes a MAT position, MIT position and the next write position. In some circumstances, the Receiver context record 270 and a set of Image Trail context records 271 may be collectively called the Receiver context record or Receiver context records, since these context records are collectively used to enable the Receiver process to restart itself and to resynchronize with the Extractor process.

As stated earlier, two image trail buffers 274 are used for each image trail, and these are used in alternating fashion. Each image trail buffer 274 consists of fourteen blocks 393 of data where the size of each block is 4K bytes. Each 4K block 393 begins with a block header 394 that includes:

the block's file storage location consisting of the relative byte address (rba) of the beginning of the block with respect to the beginning of the image trial file;

a Master image trail (MIT) position indicator, indicating the location of the MIT block in which the Receiver last wrote a commit/abort record before any audit records were stored in the current image trail block 393;

a pointer to the first audit image record to start in the buffer block (i.e., in almost all circumstances the first image record to start in the buffer will not be stored starting at the beginning of the body of the buffer block); and the MAT position of the audit image record at the beginning of the buffer block (which will usually begins in an earlier block).

Figure 15A:
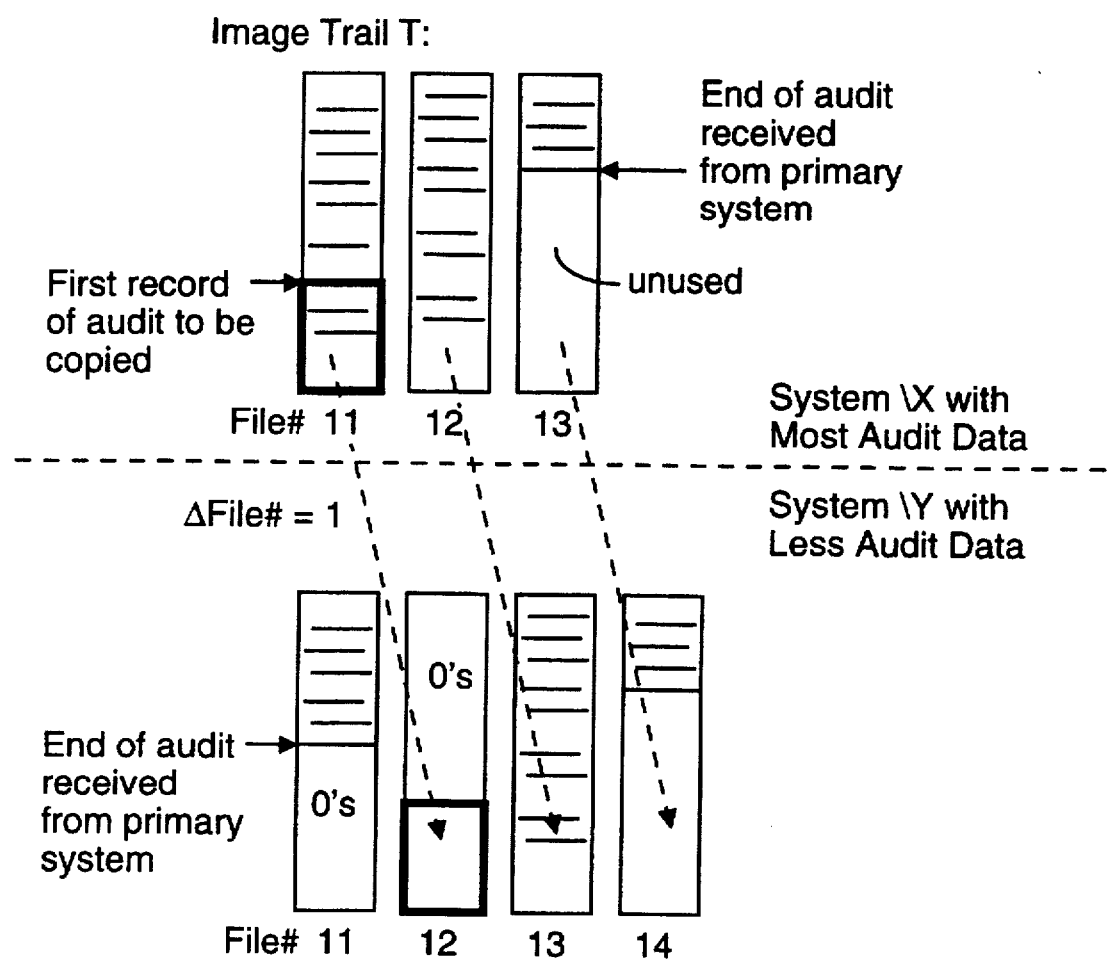
FIGS. 15A, 15B and 15C depict data structures associated with the CopyAudit procedure used in a preferred embodiment of the present invention.
Figure 15B:
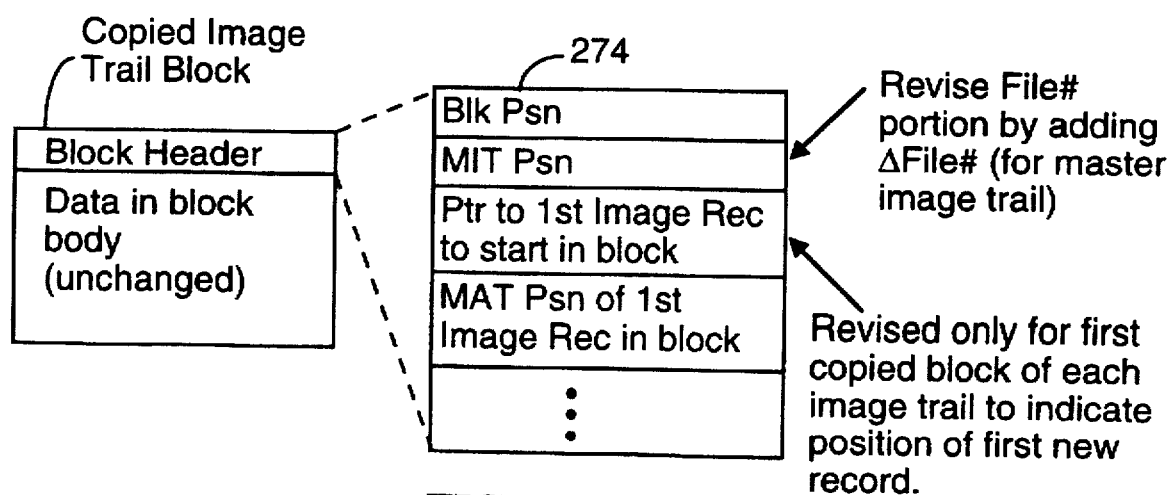
Figure 15C:
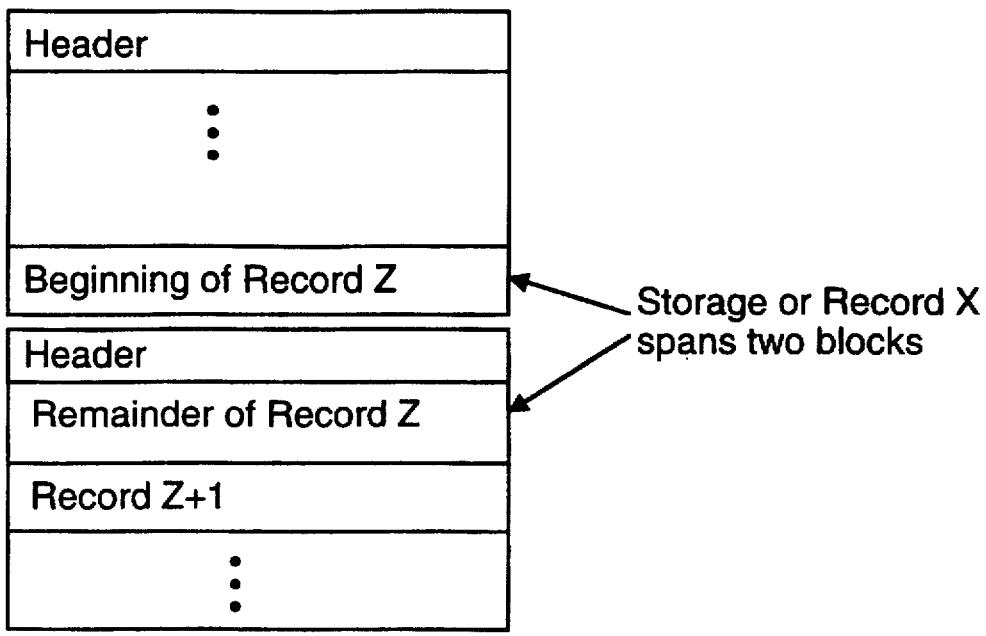

Audit image records rarely conform exactly to buffer block boundaries, and therefore the audit image record at the end of one buffer block usually continues at the beginning of the next, as shown in FIG. 15C.

A typical MIT position value would be "10, 8192", where the "10" represents the file sequence number within the corresponding sequence of image trail files, and the "8192" represents a relative byte offset from the beginning of the image trail file to a block header.

As explained earlier, every audit record shipped to the Receiver process 132 has a MAT position value inserted in it by the Extractor process. The MAT position in an image trail context record 271 indicates the MAT position of the last audit record durably stored in the image trail file.

The MIT position in an image trail context record 271 indicates a MIT position associated with the last durably stored image trail block. This is the MIT position in the last 4k block header of the last image trail buffer stored before the image trail context record 271 was last stored.

Furthermore, each image trail buffer 274 is written to the corresponding disk file only (A) when the image trail buffer 274 is full (i.e., contains 52K of data) or (B) when the Receiver process performs a periodic flush operation. Each time data from any image trail buffer 274 is written to disk, the disk file location for the next write to the image trail file (i.e., the disk address for the current end of the image trail file) is stored in the appropriate field of the image trail context record 270. However, as will be described below, the image trail context record is durably stored once every M seconds, where M is the number of seconds between executions of the Receiver context save procedure.

The restart MIT position 390, stored in local memory, is derived from the Updater status table 400, as will be described below. Basically, the restart MIT position is a position in the Master Image Trail at which the Receiver process 132 should start processing audit records for rebuilding the transaction status table 144. From another viewpoint, the restart MIT position 390 indicates that all items in the transaction status table with lower MIT positions can be discarded.

The Receiver.StopUpdatersCnt 391 is a count value that is incremented each time the Receiver encounters a Stop-Updaters record in a received message buffer whose MAT value is higher than the MAT position for at least one image trail. This will be explained in more detail below.

The image trail status array 392 stores, for each image trail, a set of buffer location information, the MAT value of the last record stored in that image trail, and a Mellow flag. The buffer position information for an image trail includes pointers to the two buffers used by the image trail, an index indicating which of the two buffers is currently being written to, a pointer to the current block being written to, and a pointer (or offset) to the position within that block at which the next image record for the image trail will be written. The buffer position information is updated every time an audit record is added to an image trail buffer. The Mellow flag is used in association with the durable storage of image trail context records, as is described in more detail below with reference to FIGS. 8C, 8H and 8I.

The Receiver process also stores in memory a "Next Message Sequence Number" 396, a "restart MAT position" 398, an "ExpectStopUpdate" flag 399, and a Takeover_mode flag 399A. The Next Message Sequence Number 396 is the message sequence number the Receiver expects to see in the next message buffer and is normally incremented by one after each message buffer is received. During normal operation, the restart MAT position 398 is set equal to the highest MAT value of the audit records in the last message buffer that was properly sequenced and successfully received from the Extractor. Whenever the Receiver process is started or restarted, however, the restart MAT position 398 is initially set to the lowest of the MAT position values stored in the image trail context records 271. The ExpectStopUpdate flag 399 is a flag set in response to a special "Expect Stop Update" message from the Monitor process just prior to a StopUpdaters audit record being moved by the Extractor process into its current message buffer.

The Takeover_Mode flag 399A is set whenever the backup portion of the RDF system is performing an RDF takeover operation. When the Takeover_Mode flag is set, the Receiver and Updaters operate differently than usual, as will be described in more detail below.

Referring to FIG. 7F, the Updater status table 400 maintained by the Receiver process stores the following information for each Updater process: a value 402 that identifies the associated image trail, the LimitPosition location 404 currently assigned to the Updater, the last Restart MIT position 406 reported by the Updater process, and the last Restart image trail file position 408 reported by the Updater process to the Receiver process. The meaning of these fields will be explained below.

Referring to FIG. 7G, the transaction status table 144 maintained by the Receiver process includes for each commit/abort record stored in the master image trail 136 a transaction ID 410, a status value 412 (i.e., commit or abort), the MIT position of the commit/abort record, and the commit/abort timestamp value 413 generated by the primary system when it committed or aborted the associated transaction.

Referring to FIGS. 8A–8I, the Receiver process 132 works as follows.

Figure 8A:
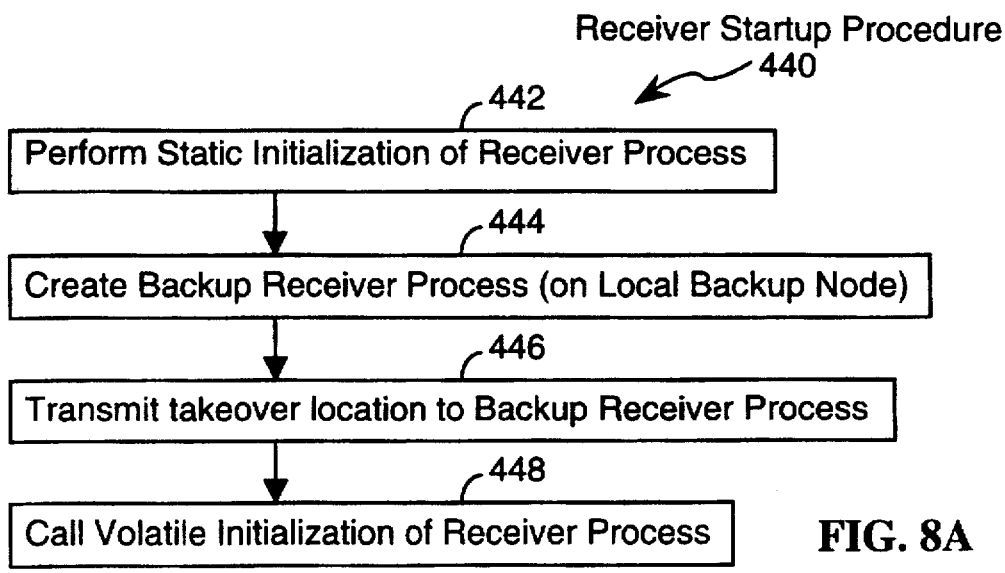
FIGS. 8A–8I flowcharts of procedures executed by the Receiver process in a preferred embodiment of the present invention.

Referring to FIG. 8A, the Receiver Startup Procedure 440 is called whenever the Receiver process 132 or its backup is started, as in the case of a failover or a transfer of control back to the primary Receiver process 132 from the backup Receiver process. The Startup procedure begins by performing a "static initialization" of the Receiver process (442), which means that all static data structures used by the Receiver process are allocated and initialized. The startup procedure then creates a backup process (444). Then a checkpoint operation is performed in which a takeover location is transmitted to the backup Receiver process (446). The takeover location is, in essence a program address, and in the preferred embodiment the takeover location is the program location at which execution of the Receiver volatile initialization procedure 450 begins. Finally, the Receiver Startup procedure calls (448) the Receiver Volatile Initialization procedure 450.

Figure 8B:
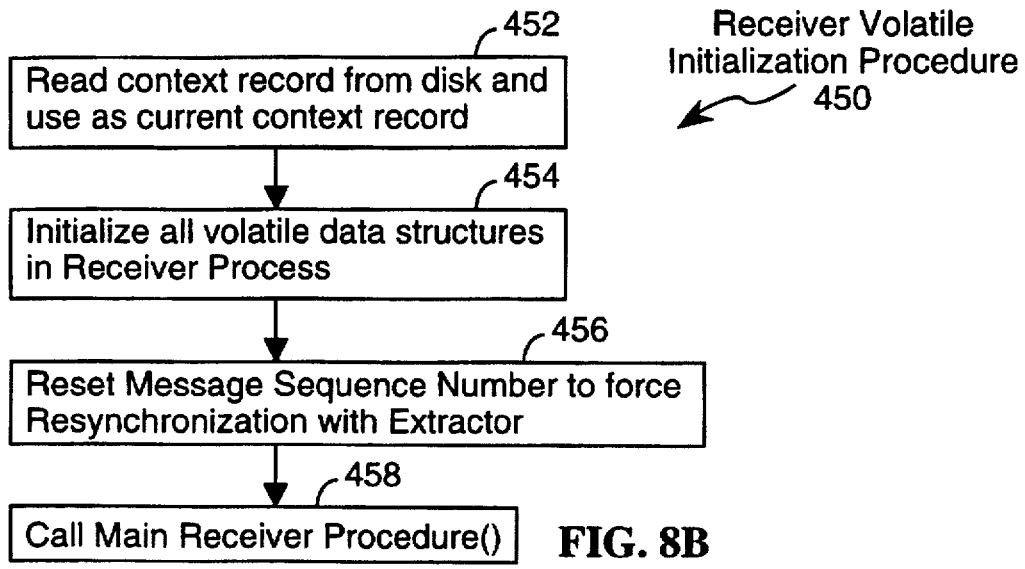

Referring to FIG. 8B, the Receiver Volatile Initialization procedure 450 is called during startup by the Receiver Startup procedure 440. The Receiver Volatile Initialization procedure 450 begins by reading the last stored Receiver context record and the last stored image trail context records from disk and using those context records as the Receiver's current context records in volatile memory (452). Then the Receiver Volatile Initialization procedure allocates and initializes all volatile data structures (454) used by the Receiver process, including the image trail buffers 274, the image trail status array 392, the Updater status array 400 and the transaction status table 144. Then the Receiver Volatile Initialization procedure sets the Receiver's Expected Message Sequence Number to "1" (456). This will force the Receiver and Extractor to resynchronize, unless the Extractor is starting up at the same time such as in response to a "Start RDF" command. Finally, the Volatile Initialization procedure calls (458) the Main Receiver procedure 460.

Referring to FIGS. 8C–8I, the Main Receiver procedure 460 includes a subprocedure 470 for periodically flushing image trail buffers to disk and for saving the Receiver's context record. This subprocedure is called every M seconds, where M is preferably a value between 5 and 25 and is typically set to 5. The first step (472) of the context save procedure performs a "lazy" flush of image trail buffers to disk. In particular, it checks the Mellow flag for each image trail. For each image trail having a Mellow flag that is set, the FlushImageTrail procedure is called. For each image trail having a Mellow flag that is not set, but for which any records have been written since the last image trail context save for that image trail, the Mellow flag is set. The FlushImageTrail procedure is described below with reference to FIGS. 8H and 8I.

After the image trails have been flushed or marked for flushing during the next execution of the context save subprocedure, the Receiver's context record is durably stored on disk using a WaitUntilComplete write operation (474) (i.e., the step does not complete until the associated disk process sends a completion message back to the Receiver process).

Figure 8C:
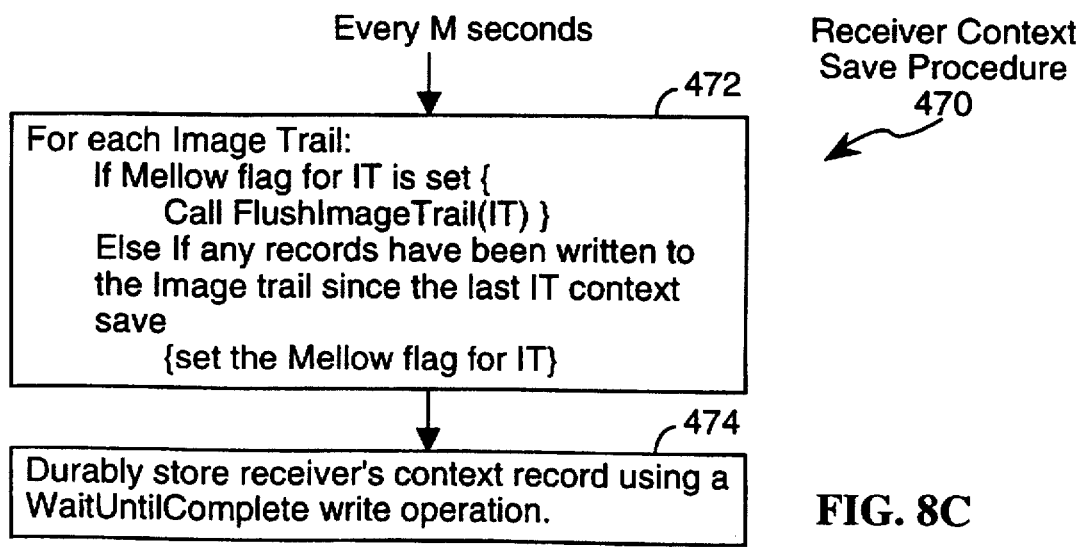
Figure 8D:
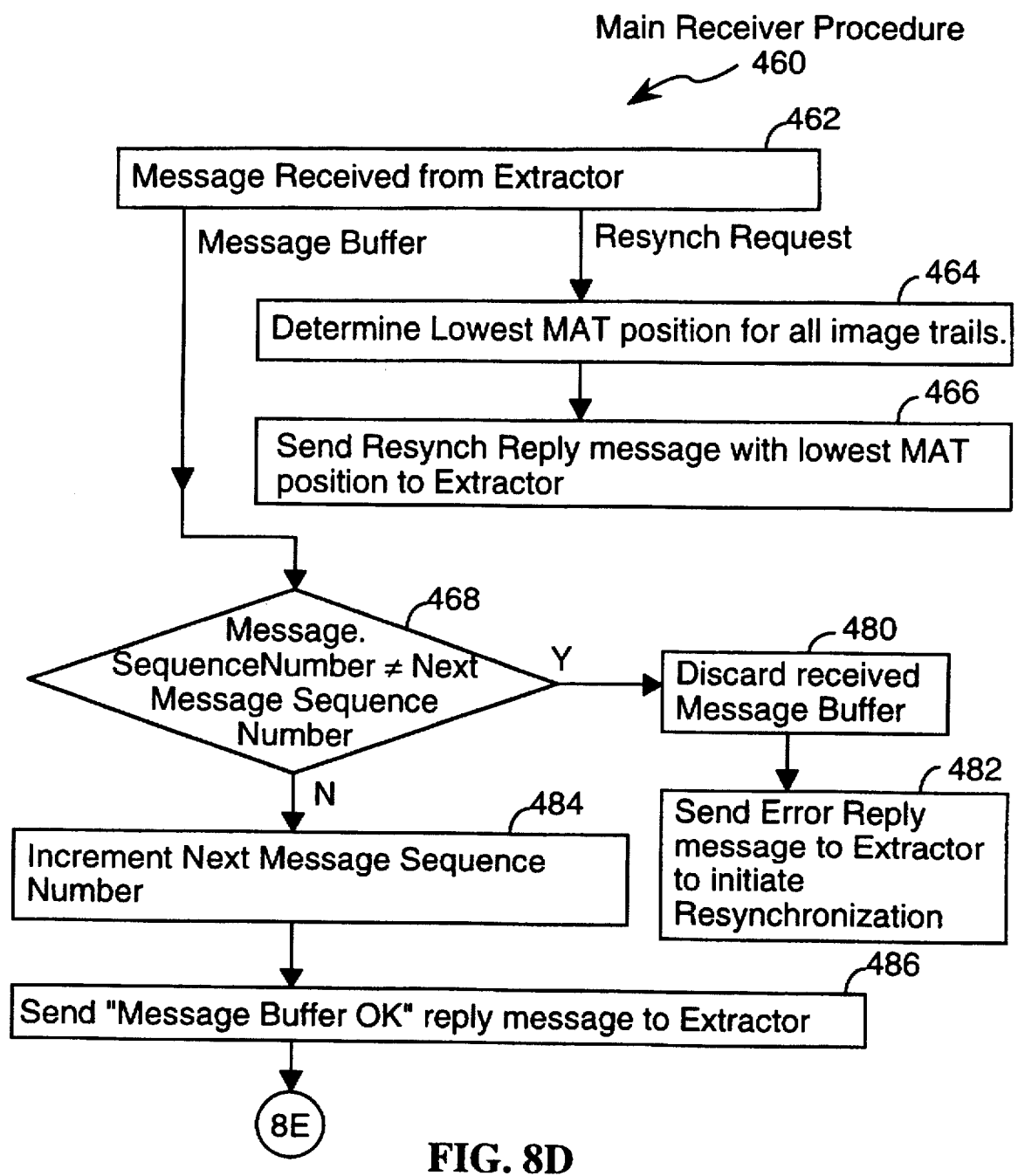
Figure 8E:
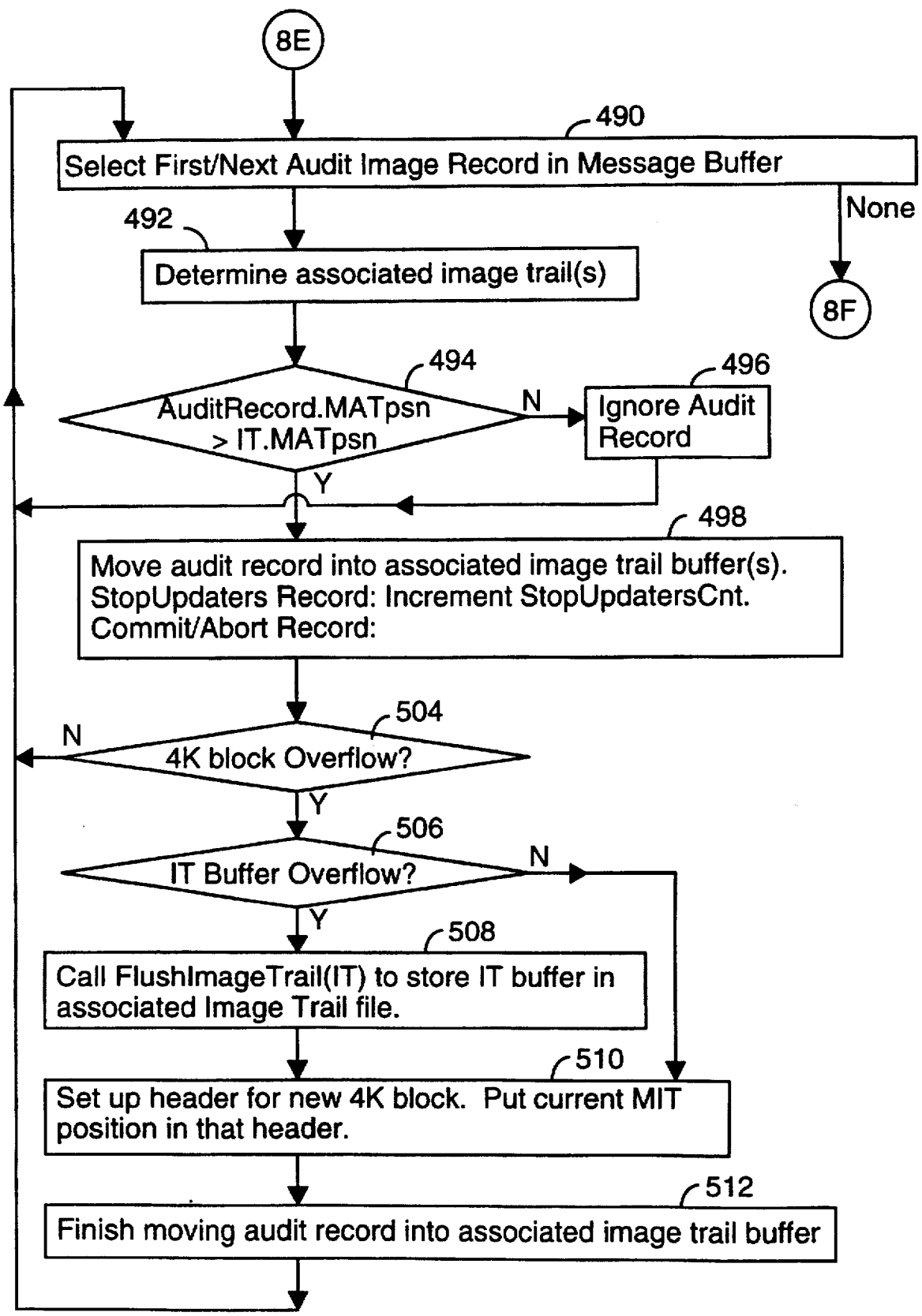
Figure 8F:
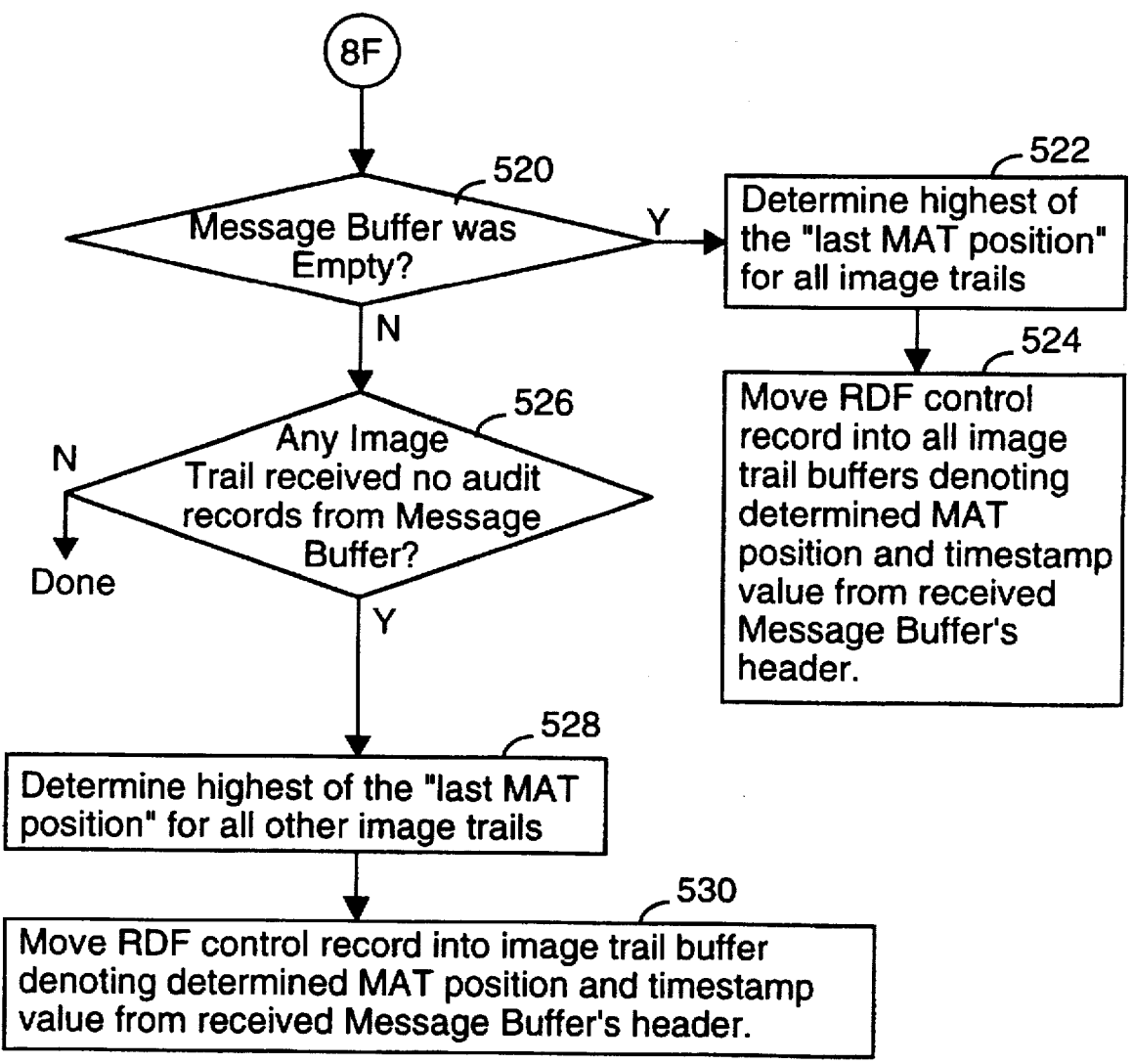
Figure 8G:
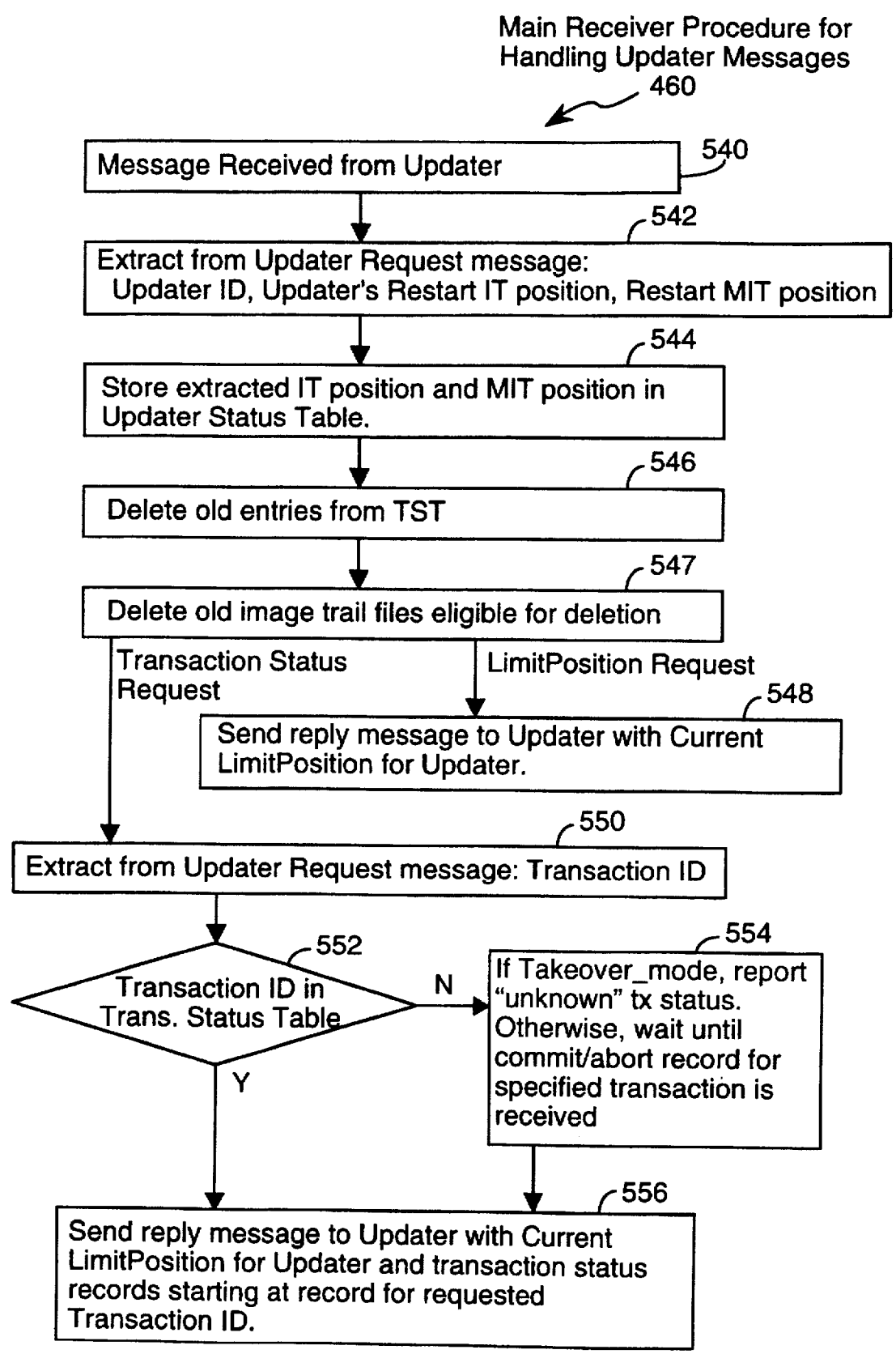
Figure 8H:
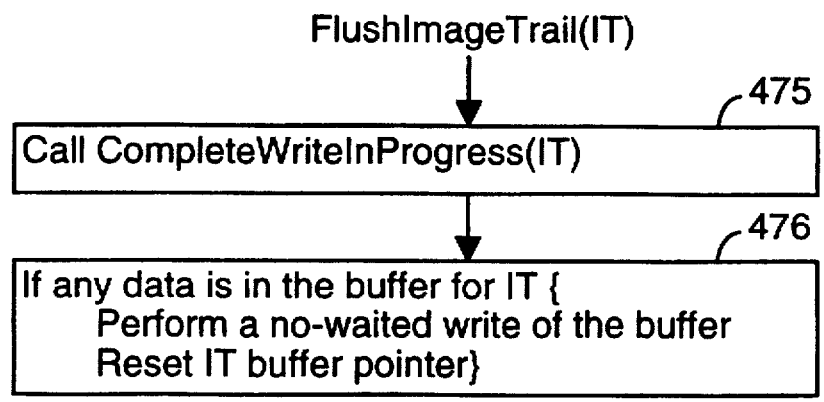

Referring to FIG. 8H, the FlushImageTrail procedure uses "no-waited writes" to write the contents of an image trail buffer to disk. When a no-waited write is initiated, the process initiating the write is not blocked. Instead it continues with execution of the program(s) it is currently executing without waiting for the write to complete. However, each time the FlushImageTrail procedure is called for a particular image trail, the first thing it does is call the CompleteWriteInProgress procedure (shown in FIG. 8I) to ensure that any previously initiated write for that image trail has completed successfully (step 475). Then the FlushImageTrail procedure performs a no-waited write on the image trail buffer to disk, and resets the image trail's buffer position information to reference the beginning of the other buffer 274 for the image trail (step 476). Because of the operation of the CompleteWriteInProgress procedure, the other buffer 274 for the image trail is known to be available for use when step 476 is executed.

Figure 8I:
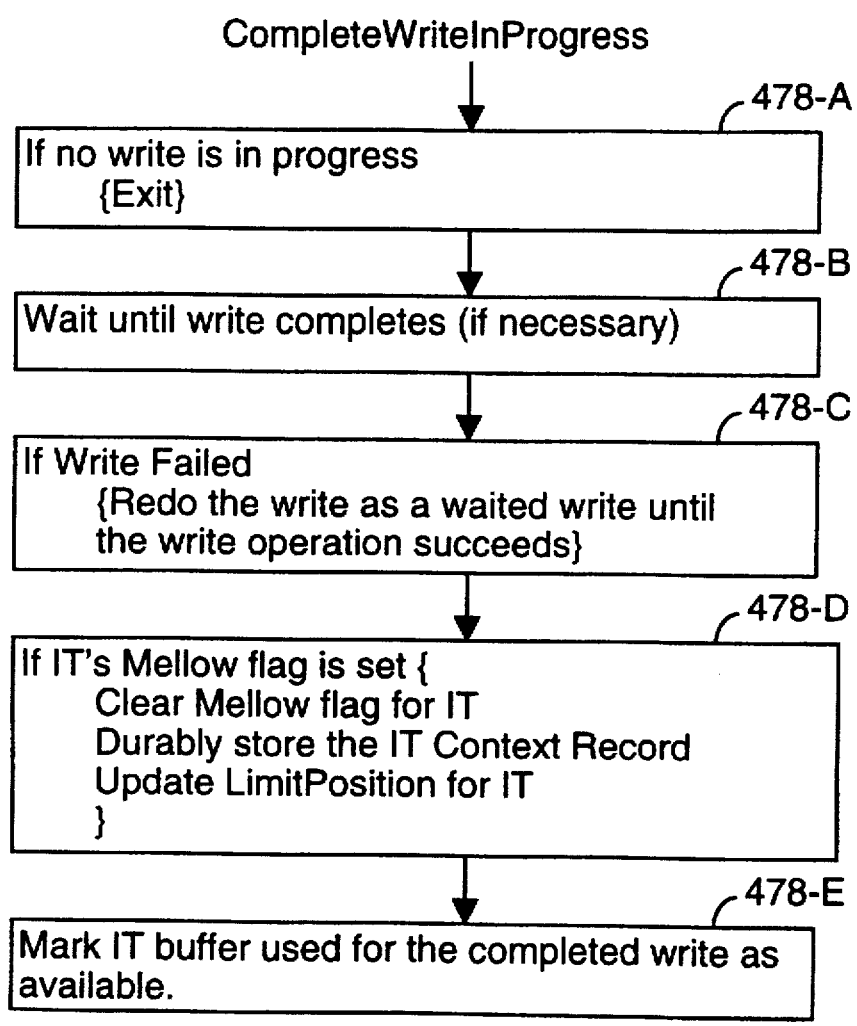

Referring to FIG. 8I, the CompleteWriteInProgress procedure immediately exits if no write for the specified image trail is in progress (step 478-A). Also, if a previously initiated write is still in progress, the procedure waits until it completes (step 478-B). Also, if a previously initiated write has failed, the write operation is repeated using a waited write operation until the write successfully completes (step 478-C). Next, if the Mellow flag of the image trail being processed is set, the Mellow flag is cleared, the Image Trail context record is durably stored and the LimitPosition for the Image Trail is updated (step 478-D). Finally, the image trail buffer associated with the write operation that has completed is marked as available so that it can be used once again by the Receiver process (step 478-E).

The Receiver context save and image trail flushing procedures shown in FIGS. 8C, 8H and 8I are very efficient, enabling the Receiver to manage many image trails and save context in a timely manner. This can be best appreciated by reviewing the operation of these procedures in two exemplary situations. For each situation discussed, it is assumed that there are three image trail buffers: MIT, IT1, and IT2.

Situation A. The context save timer pops and the Receiver's context save procedure is called. Because the mellow flags for the image trails are not set, they are now set and the Receiver immediately resumes processing new audit sent by the Extractor.

When the context save timer pops again and the context save procedure is called, it invokes the FlushImageTrail procedure for each image trail because the mellow flag is set for each of the image trails. Since no writes are currently outstanding to each image trail file, the CompleteWriteInProgress returns immediately, and no waited writes are initiated to store the current image trail buffer for each image trail to disk. The alternate buffer for each trail becomes the new current buffer. Because these writes are no-waited, the Receiver immediately returns to processing new data from the Extractor, storing said image audit in the new current buffers.

When the Receiver's context save timer pops again and the Receiver context save procedure is called, the mellow flag is still set for each trail. Therefore the FlushImageTrail routine is called for each image trail, which in turn calls the CompleteWriteInProgress routine for each image trail. Because these writes were initiated previously, the Receiver does not actually have to wait. Assuming each previously initiated buffer write completed without error, the mellow flag is now cleared for each image trail and the context record for the image trails are written to disk using a waited write operation. However, since the context records are small, these writes are completed almost immediately. Each image trail's context record on disk now reflects all data just written. Program control then returns to the Receiver's context save procedure and then to the Receiver's main procedure, where it resumes processing new data from the Extractor.

The context save and FlushImageTrail procedures almost never wait for disk operations to be performed because the image trail buffer write operations complete between executions of the context save procedures. As a result, the Receiver's processing of data from the Extractor is virtually uninterrupted by the image trail buffer flushing and context saving operations. This remains true even if the Receiver is servicing as a hundred image trails.

Situation B. In this situation, so much audit is being sent to the Receiver that an image trail buffer fills before the context save timer pops. When a buffer write operation is initiated for each image trail, the alternate buffer becomes the current buffer.

When the context save timer pops, the context save procedure is called. Because the mellow flag is not currently set, it is now set and the Receiver returns to processing new data from the Extractor. This allows more records to be stored in the current image trail buffer.

If the current image trail buffer is filled before the next Receiver context save, the FlushImageTrail procedure is called. Before starting the write operation, the CompleteWriteInProgress procedure is called. Because the previous write was no waited and was issued previously, that write will already have completed and the Receiver does not have to wait for that write operation to complete. The CompleteWriteInProgress procedure clears the image trail's mellow flag, and durably stores the image trail's context record. Then the FlushImageTrail procedure issues a new no waited write for the full image trail buffer, makes the other buffer the new and current buffer, and returns immediately to processing new audit from the Extractor.

When the context save timer pops again and the Receiver's context save procedure is called, the mellow flag is set and the Receiver returns immediately to processing new audit from the Extractor.

When the current image trail buffer fills again and must be written to disk, the CompleteWriteInProgress procedure is called by the FlushImageTrail procedure. Again, there was a previous write, but it has already completed. Therefore the CompleteWriteInProgress procedure clears the mellow flag and updates and durably stores the image trail's context record, which now reflects all audit image records written to disk by the write that just completed. The FlushImageTrail procedure issues a new no waited write for the full image trail buffer, the buffer whose contents have already been written to disk is made the new current buffer, and then the Receiver returns immediately to processing new audit from the Extractor.

Thus, when under pressure from high amounts of audit being sent by the Extractor, the Receiver is able to update its context quickly and resume processing audit image records, only having to wait for the image trail context write to complete, but not having to wait at all for image trail buffer writes to complete. This is as effective for a hundred image trails as it is for one.

The Receiver process 132 is a "passive" process in that it does not initiate messages to other processes. Rather it only responds to messages from the Extractor process 130, messages from the Updater processes 134, and from the Monitor process 140.

Referring to FIGS. 8D, 8E and 8F, when a message is received from the Extractor process (462), if the message is a Resynch request message, the Receiver determines which of the MAT positions listed in Image Trail context records is lowest (464), and sends a Resynch Reply message to the Extractor with the determined lowest MAT position embedded in the reply message (466).

If the received Extractor message is a message buffer message, the message sequence number (denoted Message.SequenceNumber) in the received message is compared with the locally stored Next Message Sequence Number (468). If the received message sequence number is not equal to the locally stored Next Message Sequence Number, the received message buffer is discarded (480) and an Error Reply message is sent to the Extractor (482) indicating the need to re-establish synchronization.

If the received message sequence number is in sequence, the locally stored Next Message Sequence Number is incremented by one (484) and a "Message Buffer OK" reply is sent to the Extractor (484). A message buffer identifier is associated with the received message and is also associated with the reply message so that the Extractor can properly update its message buffer status table by marking the acknowledged message buffer as available.

Next, all the audit image records in the received message buffer are processed in sequence (490). For each record, the image trail associated with the record is determined (by determining the database volume updated on the primary system, determining the Updater responsible for replicating RDF protected files on that volume and then determining the image file associated with that Updater) (492). Next, the MAT position (AuditRecord.MATpsn) in the audit record is compared with the MAT position (IT.MATpsn) for the identified image trail (494). If the audit record's MATpsn is not larger than the image trail's MATpsn, the audit record is ignored (496) because it has already been processed by the Receiver. Otherwise, the audit record is moved into the identified image trail buffer, and the associated image trail's current MAT position (IT.MATpsn in the image trail status array 392) is updated to this audit record's MAT position (498).

If the received record is a "Stop Updaters" record, step 492 determines that the record is associated with all the image trials. The Stop Updaters record is written to the image trail buffer for each image trail whose MAT position (i.e., the MAT position of the last record written to the image trail) is less than the Stop Updaters record's MAT position (AuditRecord.MATpsn). Normally, unless there has been a recent Receiver process failure, the Stop Updaters record will be written to every image trail. Next, all the image trails buffers to which the Stop Updaters record was written are flushed to disk and the corresponding Image Trail context records are updated and durably stored to disk. Once the Receiver detects that the image trail disk cache flushes and context record saves have completed, the Receiver increments the Receiver.StopUpdatersCnt 391 count value in its context record and durably stores the Receiver context record to disk. By following these steps the Receiver ensures (A) that each Stop Updaters record is durably stored to all image trails, and (B) that the Receiver.StopUpdatersCnt 391 count value is incremented once, and only once, for each distinct Stop Updaters record.

If the record is a commit or abort record, a corresponding transaction status record is added to the transaction status table 144 (498).

However, if moving an audit image record into an image trail buffer would overflow a 4K byte block in the image trail buffer (504), special processing is required (see description of steps 510, 512 below). Furthermore, if moving the audit record into the image trail buffer would overflow the last block in the image trail buffer (506) the entire image trail buffer through the last 4K block is durably stored in the associated image trail file (508) by calling the FlushImageTrail procedure (see FIGS. 8H and 8I).

If a 4K byte block has been filed, the procedure sets up a new 4K block either in the same buffer is there is room for another 4K block, or in the other buffer for the image trail if the current buffer has been filed. In either case, the following information is stored in the block header for the new block: the position of the block in the image trail file, the current MIT file position (which is the MIT file and block header position associated with the last audit record written to the MIT message buffer), a pointer to the first record (if any) whose beginning is located in the 4K block, and the MAT position of the record located immediately after the block header (see earlier discussion of FIG. 7D). Then the process of moving the current audit record into the image trail buffer is completed (512) and processing of the next audit record (if any) in the received message buffer begins at step 490.

If the received message buffer was empty (520), the Receiver determines the highest of the MAT positions stored in the context records for all the image trails, which is equal to the MAT position of the last audit record received from the Extractor in the last message buffer received that contained any audit records. Then an "RDF control record" is moved into all the image trail buffers (524). The RDF control record denotes (A) the determined highest MAT position, and (B) the timestamp value in the received message buffer's header.

If the received message buffer was not empty (520), but if one or more image trails received no audit records from the current message buffer (526), the Receiver determines the highest of the MAT positions stored in the context record for all the other image trails (528), which is equal to the MAT position of the last audit record received from the Extractor in the current message buffer. Then an "RDF control record" is moved into each image trail buffer that did not receive any audit records (530). The RDF control record denotes (A) the determined highest MAT position, and (B) the timestamp value in the received message buffer's header.

Referring to FIG. 8G, when a message is received from any Updater process (540), the message is initially processed by extracting from the Updater request message (A) the Updater's identifier, (B) the Updater's restart image trail position, and (C) the restart MIT position read by the Updater from a block header in the Updater's image trail (542). The extracted restart image trail position and restart MIT position are stored in the Updater Status table (544). Using the updated information in the Updater Status table, the Receiver deletes any entries from the transaction status table that are no longer needed, because they have MIT positions less than the lowest Restart MIT position reported by any of the Updaters (546). In addition, the Receiver process deletes any image trail files eligible for deletion based on the updated image trail position values received from the Updater (547).

If the received Updater request message is a LimitPosition request message, the Receiver reads the current LimitPosition location for the Updater and sends a reply message with that LimitPosition location to the requesting Updater (548).

If the received Updater request message is a Transaction Status request message, the Receiver extracts from the request message the Transaction identifier for which the Updater is requesting a status value (550). Then the transaction status table 144 is inspected to see if the status of that transaction is known (552). If the transaction status is unknown and the RDF system is in Takeover Mode (as indicated by the Takeover_Mode flag 399A), the Receiver reports back that the transaction status is unknown. Otherwise, if the transaction status is unknown and the RDF system is not in Takeover Mode, the Receiver waits until a commit/abort record for the specified transaction is received from the Extractor (554). Once the transaction status of the identified transaction is known, a reply message is sent to the requesting Updater (556). The reply message includes (A) the current LimitPosition for the Updater, and (B) a set of transaction status records, starting with the record for the identified transaction. Preferably a substantial number of transaction records (e.g., 200 records, or all the status records in the TST 144 after the identified record if less than 200) is sent with each reply so as to reduce the number of Transaction Status requests sent by Updaters.

Detailed Explanation of Updater Processes

Figure 9:
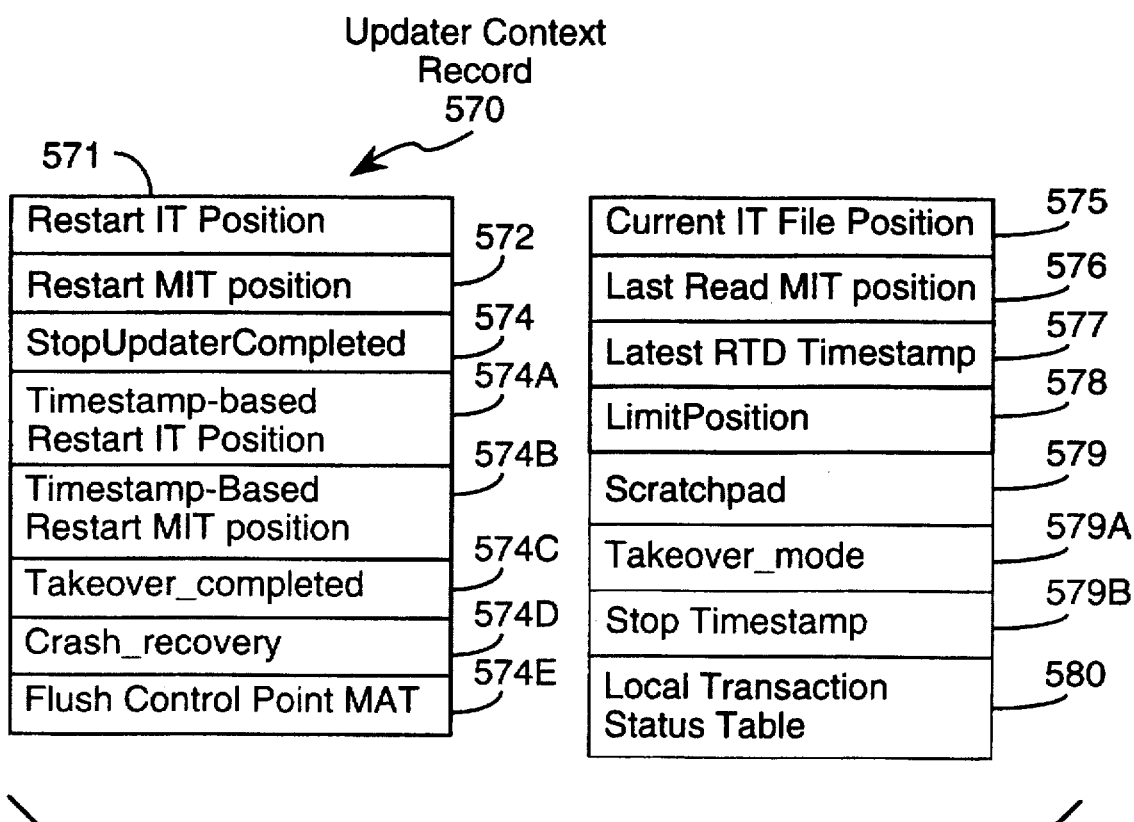
FIG. 9 is a block diagram of data structures, stored in primary memory, used by each Updater process in a preferred embodiment of the present invention.

The primary data structures used by each Updater process 134 in the preferred embodiment are shown in FIG. 9. Each Updater process durably stores a context record 570 on a nonvolatile (disk) storage device on a periodic basis (e.g., once every 2 to 10 minutes, with 5 minutes being preferred). As shown in FIG. 9 the context record includes a restart image trail position 571, indicating the position of the record immediately following the last image trail record processed by the Updater before the last Updater context save operation;

a restart MIT position 572, indicating the MIT block position associated with the last image trail block processed by the Updater before the last Updater context save operation;

a StopUpdaterCompleted flag 574, which is set when the Updater has stopped operation in response to reading a Stop Updaters record;

a timestamp-based Restart IT position 574A, used to indicating where to restart processing image trail records after a performing a "Stop Updaters at Timestamp" operation;

a timestamp-based Restart MIT position 574B associated with the image trail record at the restart position 574A;

a Takeover_Completed flag 574C that is set when the Updater completed processing all the records in its image trail during an RDF takeover operation;

a crash recovery flag 574D that is set at the end of certain operations to suppress the generation of error messages when audit records are reapplied against the backup database during a system restart; and the MAT position 574E of the most advanced flush control point record processed by the Updater.

Each Updater also stores in volatile memory a current image trail file position 575;

a "Last Read MIT Position 576, which is the last MIT position read by the Updater from a block header in the Updater's image trail;

a latest RTD (relative time delay) Timestamp value (577), equal to the last RTD timestamp of any image audit record processed by the Updater;

a LimitPosition image trail file position (578);

a scratch pad (579) for processing audit records;

a Takeover_Mode flag 579A for indicating if the RDF system is in takeover mode;

a Stop Timestamp 579B for indicating the timestamp limit on transaction updates to be applied by the Updater; and a local transaction status table (580) whose data is provided by the Receiver to the Updater.

In a preferred embodiment, the local TST 580 stores up to 4096 entries which are constructed from information received from the Receiver. Also, the local TST 580 does not store MIT position information, since that information is not needed by the Updater.

The RTD Timestamp value 577 is used by the Stop Updaters at Timestamp procedure discussed below. In addition, it is accessible by procedures executed on behalf of the Monitor process 140 for monitoring how far the Updaters are running behind the TM/MP 202, and thus how long it would take the RDF system 220 to catch up the backup database 124 with the primary database 108 if all transactions on the primary system were to stop.

Referring to FIGS. 10A–10F, the Updater processes 134 work as follows.

Figure 10A:
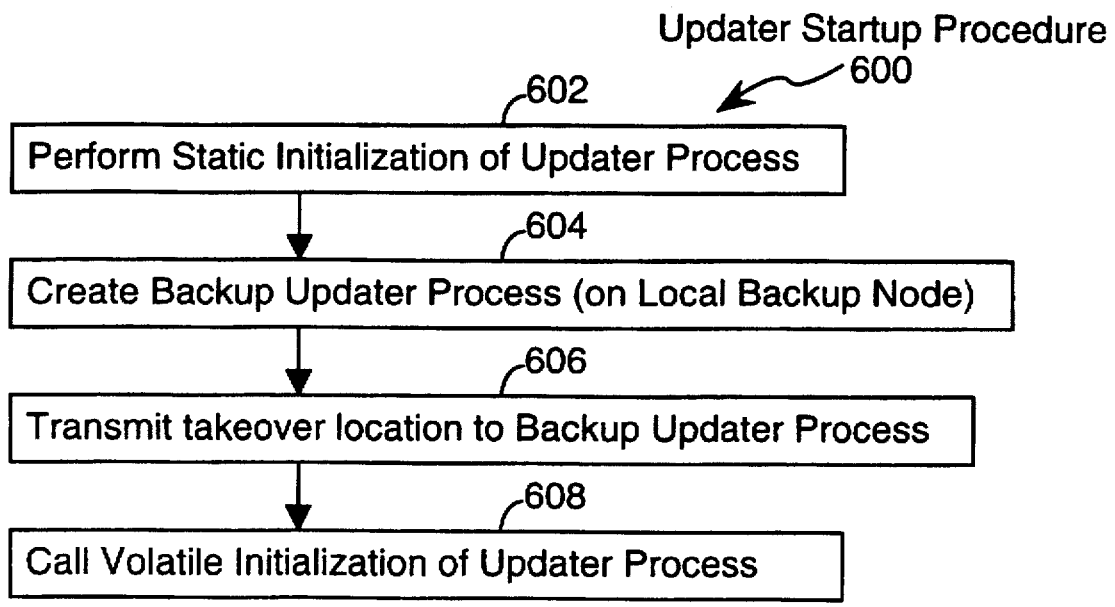
FIGS. 10A–10F are flowcharts of procedures executed by the Updater processes in a preferred embodiment of the present invention.

Referring to FIG. 10A, the Updater Startup Procedure 600 is called whenever any Updater process 134 is started. The Updater Startup procedure begins by performing a "static initialization" of the Updater process (602), which means that all static data structures (such as a map of primary volumes to backup volumes) used by the Updater process are allocated and initialized. The startup procedure then creates a backup process (604). Then a checkpoint operation is performed in which a takeover location is transmitted to the backup Updater process (606). The takeover location is, in essence a program address, and in the preferred embodiment the takeover location is the program location at which execution of the Updater Volatile Initialization procedure 610 begins. Finally, the Updater Startup procedure calls (608) the Updater Volatile Initialization procedure 610.

Figure 10B:
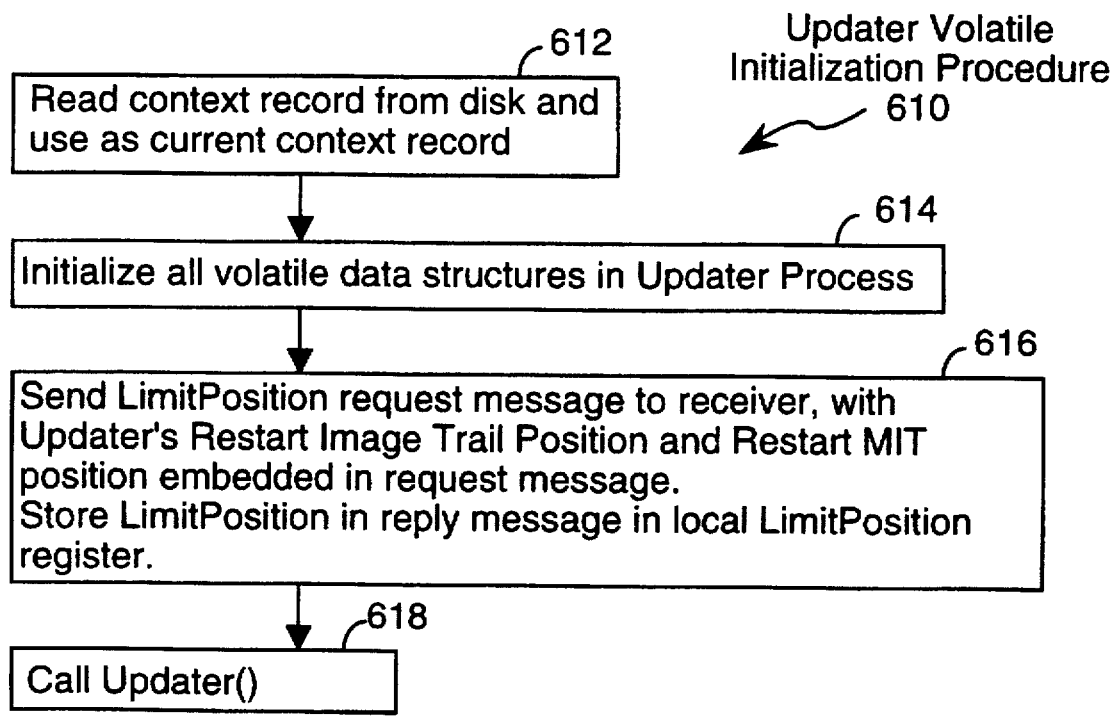
Figure 10C:
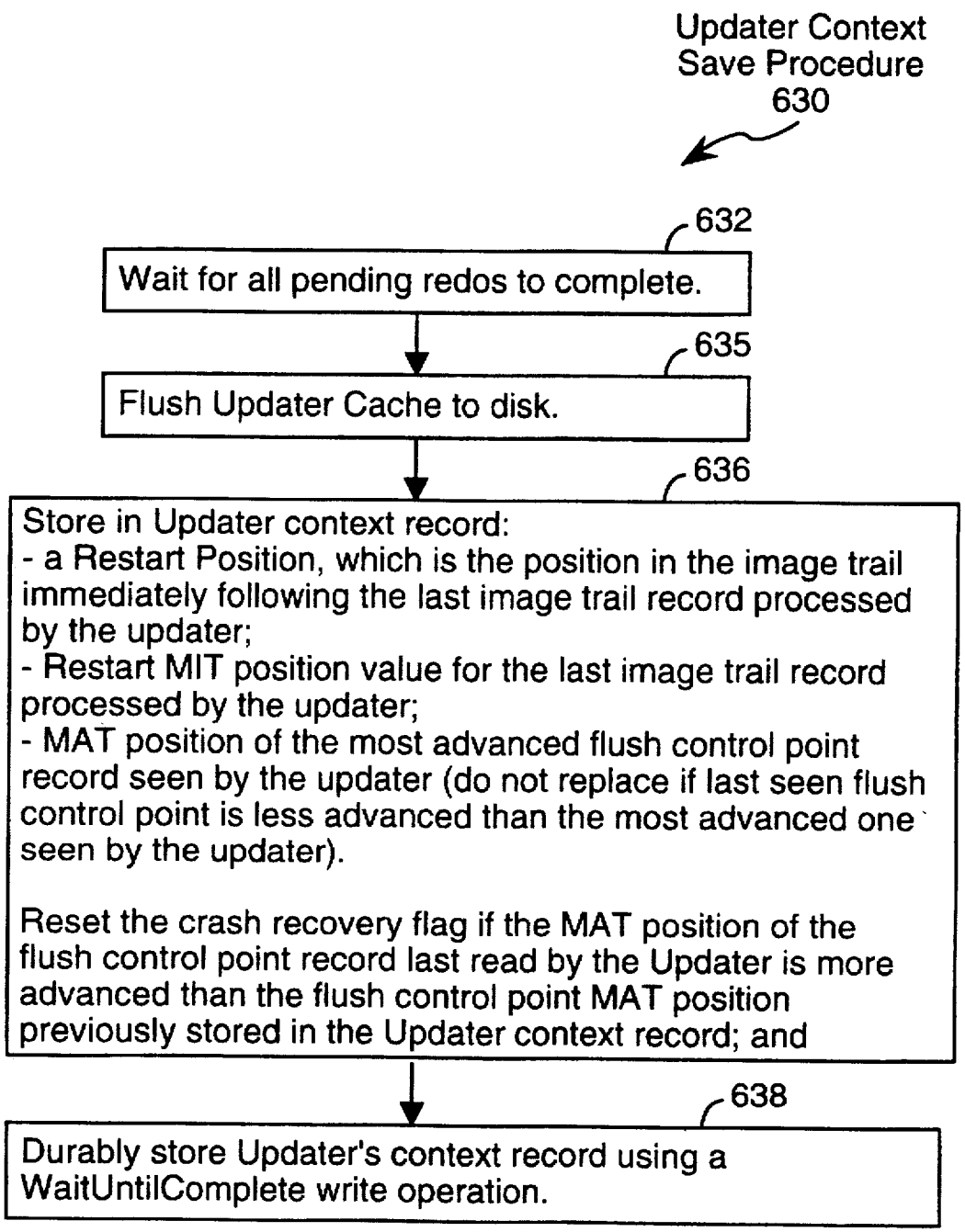

Referring to FIG. 10B, the Updater Volatile Initialization procedure 610 is called during startup by the Updater Startup procedure 600. The Updater Volatile Initialization procedure begins by reading the last stored Updater context record from disk and using it as the Updater's current context record in volatile memory (612). Then the Updater Volatile Initialization procedure allocates and initializes all volatile data structures (614) used by the Updater process, including the scratchpad 579 and local transaction status table 580. Then the Updater Volatile Initialization sends a LimitPosition request message to the Receiver with the Updater's current Restart image trail position and Restart MIT position embedded in the message, and stores the LimitPosition value in the resulting reply message in its local LimitPosition register 578. Finally, the Volatile Initialization procedure calls (618) the main Updater procedure 620.

Referring to FIGS. 10C–10F, the Main Updater procedure 620 includes a subprocedure 630 for saving the Updater's context record. This subprocedure is called whenever the Updater reads a "flush control point" record, and (B) at various other times such as when operation of the Updater is being stopped. In a preferred embodiment, the primary system's transaction processing system generates a flush control point audit record for each protected volume once every five minutes. At the flush control point, the disk cache for the protected volume on the primary system is flushed to disk and a flush control point record is inserted into the master audit trail. These disk cache flushes are performed by disk processes on the primary system and are unrelated to operation of the TM/MP and RDF systems.

The flush control points for the various protected volumes do not need to occur simultaneously or in any particular order. Each flush control point record is shipped by the Extractor process to the backup system, and the Receiver process inserts each flush control record only in the image trail for the corresponding protected volume. Since flush control point records are generated separately for each protected volume about every 5 minutes, the Updaters tend to read such flush control point records about every 5 minutes. However, since an Updater can be temporarily stalled by a long running transaction or other circumstances, the rate at which flush control point records are read by an Updater can vary significantly.

In an alternate embodiment, each Updater process would independently and asynchronously perform a disk cache flush and context save operation every X minutes, where X would typically be a value between 2 and 10.

The first step (632) of the Updater Context Save procedure 630 is to wait for all currently pending redo operations to complete so that disk process cache for the Updater's backup disk volume is known to reflect all updates through the last audit record read by the Updater. Next (634), the disk cache for the Updater is flushed to disk so that all updates are known to be durably stored. Then the procedure stores (636) in the Updater's context record:

- a Restart Position 571, which is the position immediately following the last image trail record processed by the Updater; and
- the current Restart MIT Position 576 (which is a MIT block header position);
- the MAT position of the most advanced flush control point record seen by the Updater (this field of the context record is not updated if the last seen flush control point is less advanced than the most advanced one seen by the Updater).

In addition, the crash recovery flag in the Updater's context record (574D, FIG. 9) is turned off if the last flush control point record read by the Updater has a higher MAT position than the flush control point record previously indicated (574E, FIG. 9) in the Updater's context record (792).

Finally, the context record 570 is durably stored to disk (638) using a "wait until complete" write operation so as to ensure that the context record is durably saved before any further operations can be performed by the Updater.

Figure 10D:
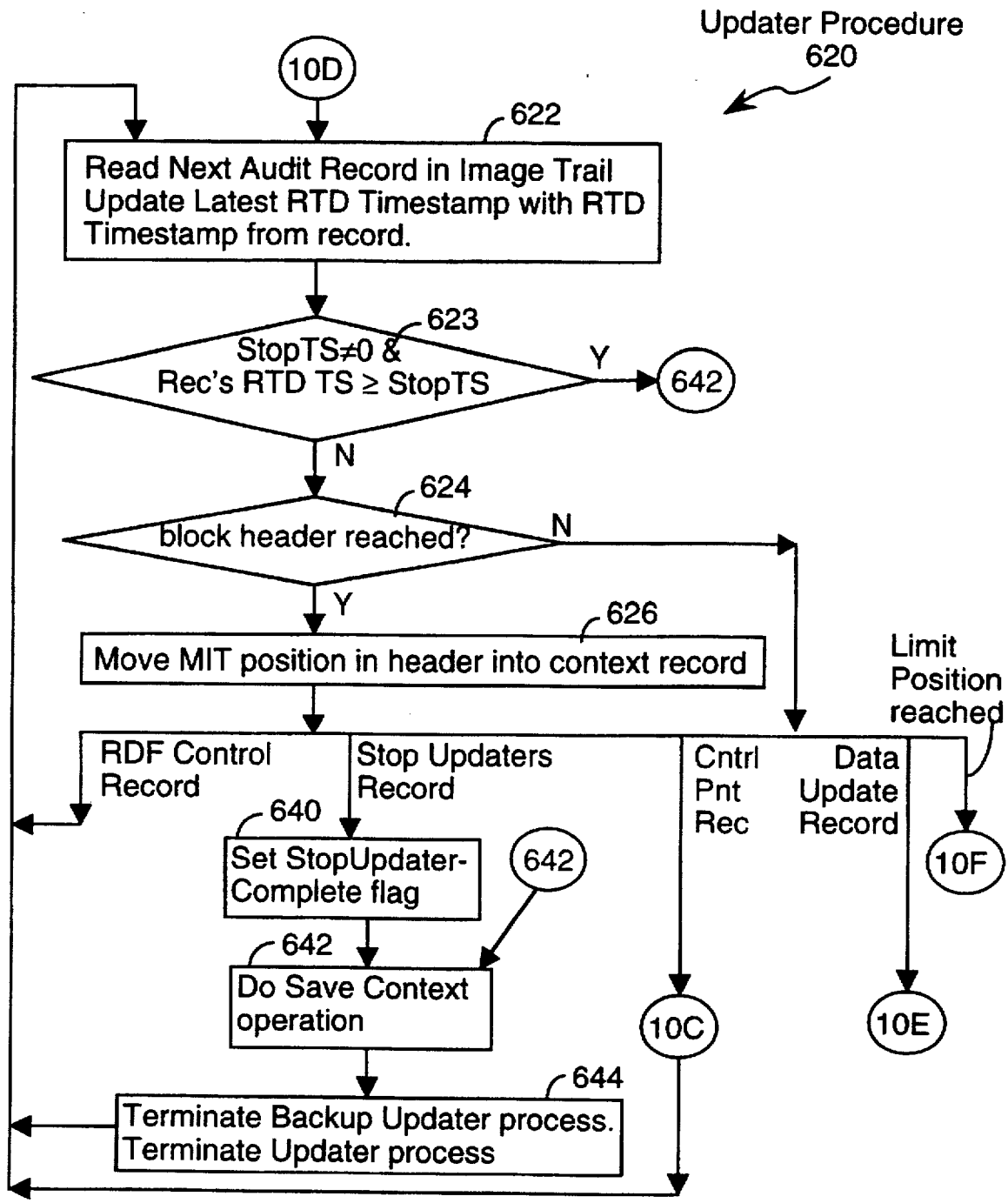
Figure 10E:
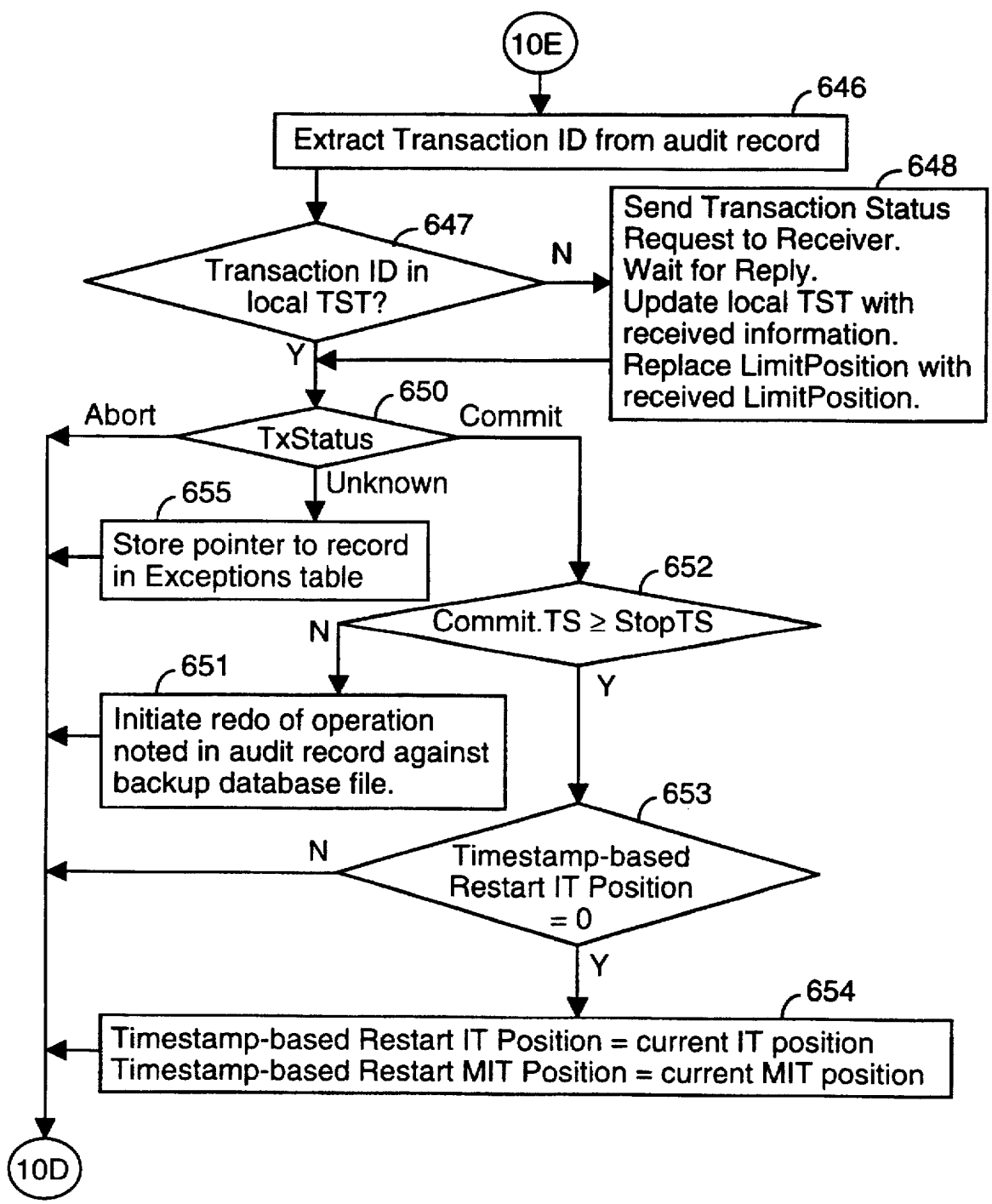
Figure 10F:
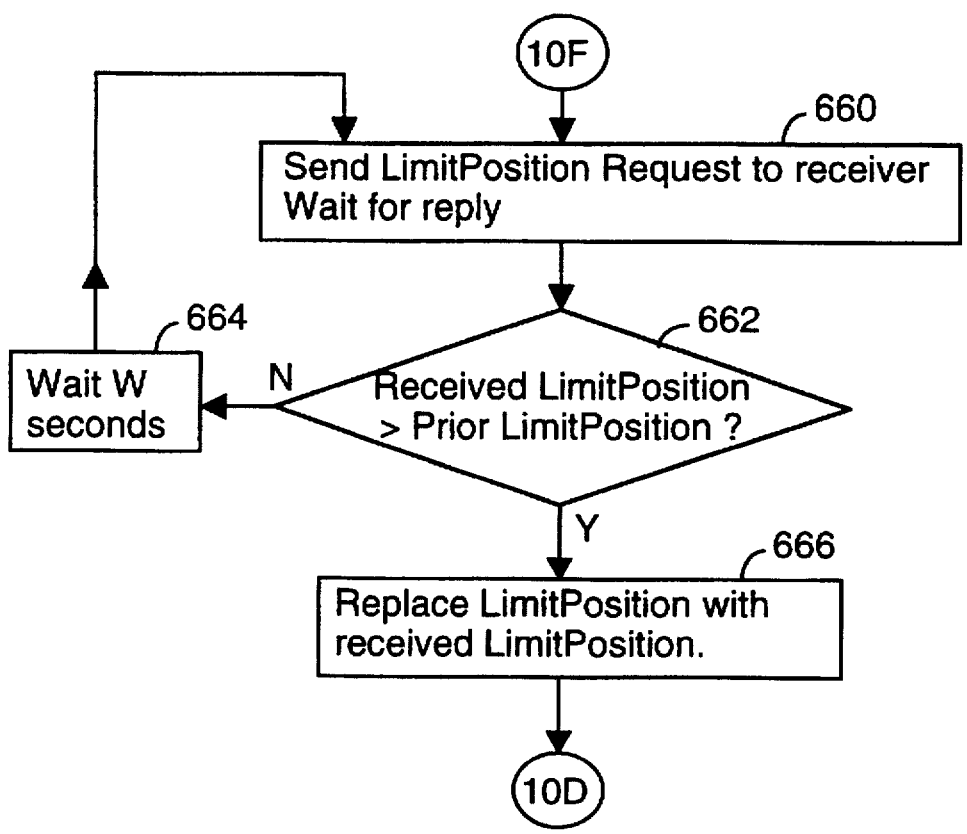

Referring to FIGS. 10D, 10E and 10F, the primary job of the Main Updater procedure 620 is to process audit image records in its image trail. At step 622 it reads the next audit image record, if any, in the image trail, and updates its locally stored "latest RTD Timestamp" 577 value with the RTD timestamp from the audit image record. If the Stop Timestamp value 579B is not zero, indicating that the Updater is performing a Stop Updaters at Timestamp operation, and the RTD timestamp in the audit image record is equal to or greater than the Stop Timestamp (623), the Main Updater jumps to step 642 for saving its context record and then terminating the Updater process. If Stop Timestamp value is zero or the current record's RTD timestamp is less than the Stop Timestamp (643-N), then the Main Updater procedure continues with normal processing of the image trail record read at step 622.

If, while reading the current image trail record a 4K byte block header is encountered (624), the MIT position denoted in that header is moved into the Updater's current MIT position register 576 (626).

If the audit record just read is a "flush control point" record, the Updater executes its context save subprocedure (see FIG. 10C), and then resumes processing with the next audit record (622).

If the audit record just read is an "RDF Control" record, no further processing of that record is required, and processing resumes with next audit record (622).

If the audit record just read is a "Stop Updaters" record, the StopUpdaterCompleted flag 574 in the Updater context record 570 is set to True (640) and the Updater context save procedure 620 is called (642). The StopUpdaterCompleted flag 574 is read by the Monitor process on the next Start RDF or Start Update operation to ensure that all Updaters have stopped and that all have processed their image trails through the StopUpdaters record (as opposed to stopping due to a failure). Then the Updater's backup process is terminated and the Updater process itself terminates (644). The Updater process will startup again after the operator of the RDF system performs on the remote backup system the DDL operation that created the Stop Updaters audit record and then enters either the "Start Update" or "Takeover" command.

If the audit record just read is a database update record, the transaction identifier is extracted from the audit record (646, FIG. 10E). Then the local transaction status table 580 is inspected to see if it contains a status record for the identified transaction (647). If not, a Transaction Status Request message is sent to the Receiver (648). When a reply message is received, and the returned transaction status is not "unknown," the local transaction status table 580 is updated with the transaction status table fragment embedded in the reply message, and the LimitPosition stored in LimitPosition register 578 is replaced with the LimitPosition value embedded in the reply message (648). If the reply message indicates that the transaction status is unknown, just one new entry is added to the local transaction status table 580 at step 648.

Once the local status transaction table contains a status record for the identified transaction, or an "unknown" status reply has been received, the transaction status of that transaction is determined (650). If the transaction status is "abort," the audit image record is ignored or skipped. If the transaction status is "commit" and the Stop Timestamp is not set, a redo of the database update operation noted in the audit record is initiated against the backup database file (651). If the transaction status is "commit", the Updater is performing a Stop at Timestamp operation, the commit timestamp for the transaction is at or after the Stop Timestamp (652), and the Timestamp-based Restart Position has not yet been set (653), then the Timestamp-based Restart IT Position is set to the current image trail position and the Timestamp-based Restart MIT Position is set to the current image trail record's associated MIT position (654). Otherwise (652-Y, 653-N), the current record is skipped and processing resumes with the next audit record. In either case, processing resumes with next audit record (622, FIG. 10D).

Figure 12:
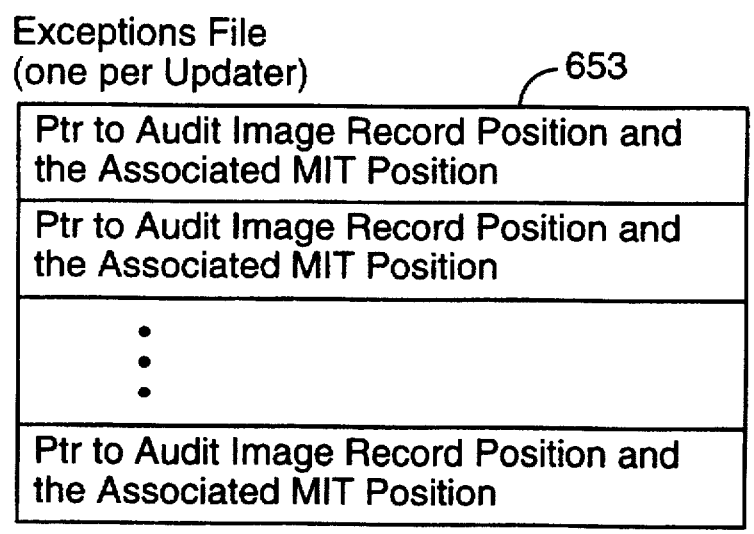
FIG. 12 depicts a Exceptions file used in a preferred embodiment.

When the RDF system is in takeover mode, the Receiver may return a "status unknown" reply, in which case just one new entry is added to the local transaction status table 580 at step 648. Further, when a transaction has an unknown status, the Updater stores in its Exceptions file 653 (see FIG. 12) a pointer to the corresponding audit image record (655), as well as the corresponding MIT position, before resuming processing with the next audit record.

When the attempt to read a next audit record (622) encounters an audit record at or beyond the LimitPosition value in LimitPosition register 578, a LimitPosition request message is sent to the Receiver (660) to determine whether the LimitPosition for the Updater has been advanced. When a reply message is received, the LimitPosition value in the received message is compared with the locally stored LimitPosition value (662). If the received LimitPosition is not larger than the previously stored LimitPosition value, the Updater 134 cannot process any further audit image records. As a result, the Updater waits for W seconds (664), where W is preferably a value between 1 and 10 and is typically set to 10, and then sends another LimitPosition request message to the Receiver (660). This continues until a LimitPosition value larger than the current LimitPosition is received from the Receiver. At that point the locally stored LimitPosition value in LimitPosition register 578 is replaced with the LimitPosition value in the received reply message, and then processing of audit image records resumes at step 622.

Figure 11:
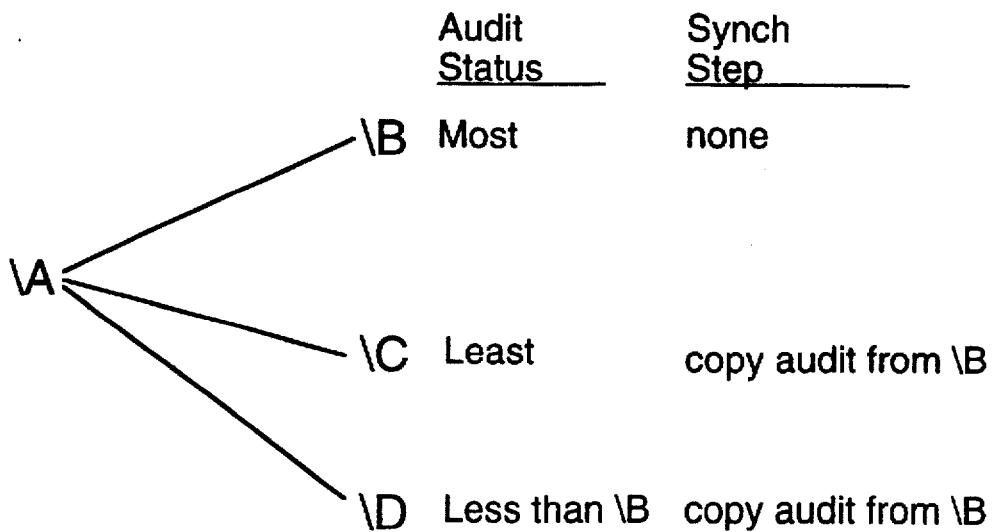
FIG. 11 is a block diagram depicting a database management system having a plurality of parallel remote duplicate database facilities and the steps to be performed to synchronize the parallel backup systems after a failure of the primary system.

Detailed Explanation of RDF Takeover When Using Multiple Parallel RDF Systems Referring to FIG. 11, there is shown in schematic form a distributed transaction processing system in which a primary system, denoted as \A, has three parallel RDF systems, each represented by a straight line, and three corresponding backup systems, denoted as \B, \C and \D. In order to provide triple contingency protection, it is a requirement in the preferred embodiment that the following characteristics of the parallel RDF systems be identical: the set of protected volumes, the number of image trails, the mapping of protected volumes to volumes on the backup systems, the mapping of Updaters (and thus backup volumes) to image trails, image trail file sizes, and the Receiver retain count. If these characteristics are not identical, synchronization of the databases on the backup systems after failure of the primary system will not be possible. In addition, while process priorities on the various RDF systems do not need to be identical, using identical process priorities is preferable so that performance of the various RDF systems is likely to be roughly the same.

The image trail file retain count, specified in the Receiver configuration record 184 (FIG. 3), specifies how many image trail files must reside on a backup system for an image trail before the Receiver will purge surplus files. For instance, if the retain count for an RDF system is set at 10, then the Receiver deletes the oldest image trail files for an image trail only when that image trail has eleven or more image trail files, and furthermore it will retain the most recent image trail files for that image trail.

The importance of the image trail file retain count value is as follows. The Triple Contingency recovery protocol, to be explained below, will only work if all the missing audit information in the backup system having the least audit information is still on disk in the backup system having the most audit information. For instance, if a first backup system has received 500 kilobytes more audit for a particular image trail than a second backup system, and if the Receiver on the first backup system has purged some its image files that contained some of that 500 kilobytes of audit, then it will be impossible to synchronize the first and second backup systems because the first backup system no longer has all the audit information needed to bring the second backup system to the same state as the first.

To determine the proper retain count value, the relative time delays (i.e., the delay between the time a database change is performed on the primary system and the time it is redone on the backup system) of the parallel backup systems should be compared over a period of time to determine the worst case differences between the systems. This should take into account planned or unplanned stoppages of the Updaters in one backup system while the Updaters in the other backup systems are allowed to continue operating. Once a worst case time delay skew has been determine (or arbitrarily selected), one also needs to determine the worst case number of image trail file rollovers that might occur during that period of time. For instance, if the worst case time delay skew is twelve hours, and the worst case number of image trail file rollovers during a twelve hour period is eight, then the retain count for the RDF systems should be set to a value of at least nine (since eight rollovers indicates that up to nine image trail files might be in use during a twelve hour period). The retain count is a function of both maximum system activity and image trail file size.

Figure 13:
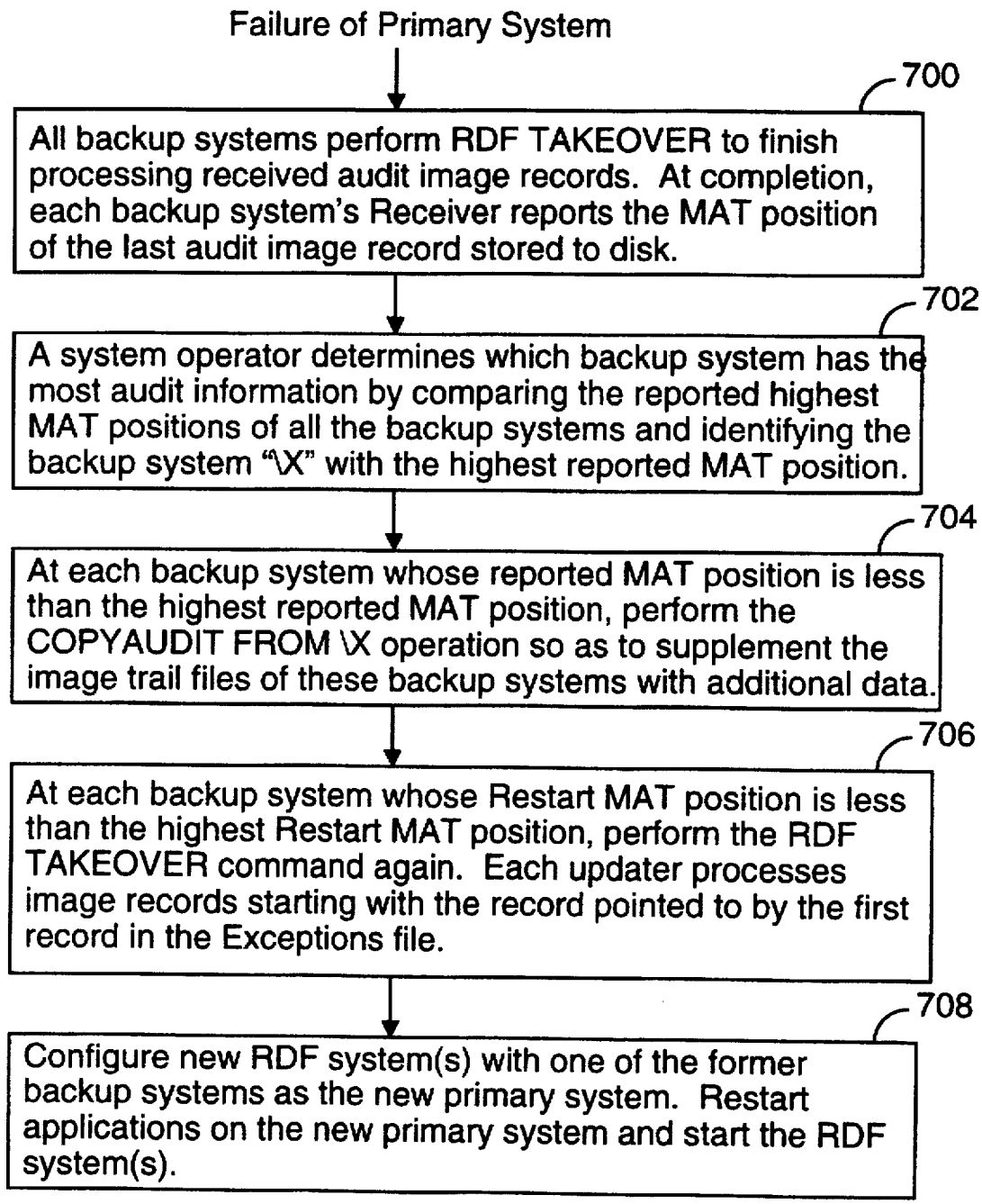
FIG. 13 depicts a flow chart of the steps performed to recover from a failure of the primary system in a preferred embodiment of the present invention.

Referring to FIGS. 11 and 13, if the primary system fails and it is determined that the failure will last long enough to require using one of the backup systems as a replacement primary system, the following sequence of operations are performed. At first, the RDF Takeover procedure is executed at all the backup systems (700). The RDF Takeover procedure, described in more detail below with reference to FIG. 14, completes the processing of all audit image records received from the primary system. Since executing the RDF Takeover procedure involves a serious interruption of normal operations, it is generally invoked at each backup system by a human operator after consultation with the operators of all the other backup systems.

At the completion of the RDF Takeover procedure, each backup system reports the MAT position of the last audit image record that it has stored to disk (i.e., in an image trail file) (700).

A system operator reviews the RDF Takeover completion messages from all the backup systems and determines which backup system has the most audit information by comparing the reported highest MAT positions. The backup system, herein called \X, with the highest reported MAT position is identified (702).

At each backup system whose reported MAT position is less than the highest reported MAT position, a CopyAudit procedure is performed (704), followed by re-execution of the RDF Takeover procedure (706). The CopyAudit procedure finds and copies the audit information that is missing in the backup systems with less audit than the \X backup system, as will be described in more detail below with reference to FIGS. 15A, 15B, 16A and 16B. After the second execution of the RDF Takeover procedure (706), the databases in all of the backup systems will be synchronized because all will now have processed the exact same audit.

Furthermore, in normal circumstances where the parallel RDF systems are only a few seconds or minutes out of phase with each other, synchronization of the databases on all the backup systems through use of the CopyAudit and RDF Takeover procedures will take place in a matter of seconds, even when the databases occupy many gigabytes of data.

Finally, one of the backup systems is selected as the new primary system, and new RDF systems are configured and initialized so as to define each of the other backup systems as backups to the new primary system. Then the execution of applications programs is restarted on the new primary system and the newly defined RDF systems are also started (708).

It should be noted that the configuration, context and Exceptions files previously stored on a backup system's control subvolume (e.g., $SYSTEM.A1) must be deleted before a new RDF configuration using the same backup system can be initialized. The RDF system will automatically purge any old image trail files when a new RDF system is first started. Therefore, referring to FIG. 11, when one of the backup systems (e.g., \B) is defined as the new primary system and an RDF configuration using a second backup system (e.g., \C) as a backup system for the new primary system, all entries formerly in the Exceptions file for that second backup system have been purged, as is all other information associated with the now discarded "old" RDF configuration.

RDF Takeover Procedure

Figure 14:
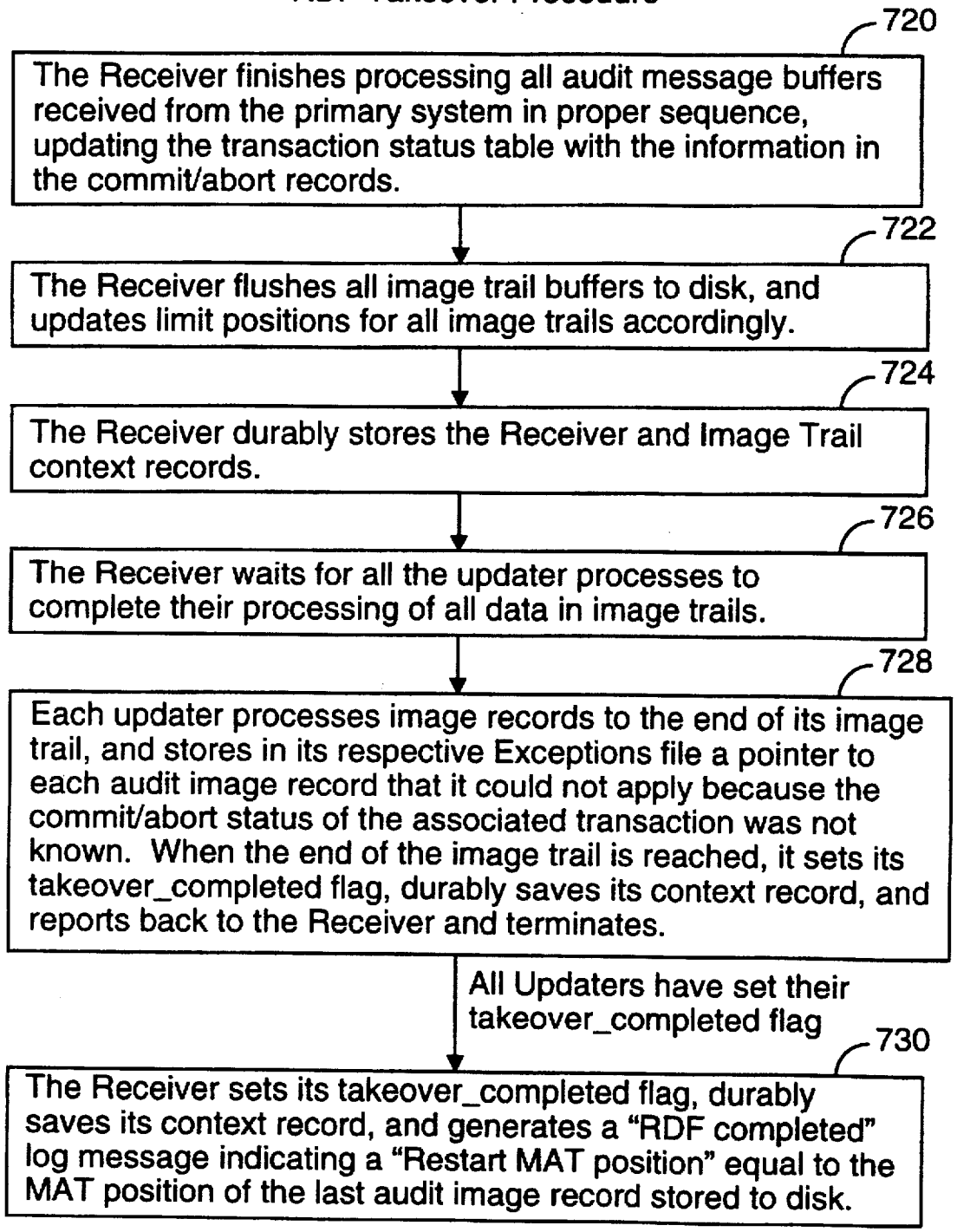
FIG. 14 depicts a flow chart of the RDF Takeover procedure used in a preferred embodiment of the present invention.

Referring to FIG. 14, the RDF Takeover procedure operates by setting the takeover mode flags (399A, FIG. 7A, and 579A FIG. 9) in the Receiver and Updater processes. The RDF Takeover procedure is prevented from being executed if the primary system is still operating. Thus, when the RDF Takeover procedure is executed, there are no longer any message buffers of audit image records being received by the Receiver from the Extractor.

In response to the Takeover notification, the Receiver completes all processing of previously received message buffers before responding to any status update requests from Updaters. This processing includes updating the transaction status table with information from received commit/abort records (720), flushing all the image trail buffers to disk, updating the limit positions for all the image trails accordingly (722), and durably storing the Receiver and Image Trail context records to disk (724). Then the Receiver waits for all the Updaters to complete their processing of the data in the image trails (726).

Whenever an Updater requests the status of a transaction for which the Receiver has not received a commit or abort record, the Receiver returns a special "unknown" status reply (554, FIG. 8G).

The Updaters respond to the RDF Takeover command by (A) performing a restart update operation (described below with reference to FIG. 18) if the Updater was shut down at the time of the takeover operation, and (B) processing all audit image records for its associated protected volume, through the last such record in the image trail (728, FIG. 14). In takeover mode, whenever the Updater receives a status "unknown" reply from the Receiver for a image trail record, it adds a pointer to that record in the Updater's Exceptions file (see step 655 in FIG. 10D). When each Updater finishes processing all the records in its respective image trail, it sets its Takeover_Completed flag (574C, FIG. 9), durably stores its context record, and reports back to the Receiver and terminates (728).

When all the Updaters have shut down the Receiver reads the Updater context records. If every Updater has set its takeover_completed flag, then the Receiver sets its Takeover_Completed flag (391A, FIG. 7A), durably stores its context record, and generates a "RDF Takeover completed" log message (stored in the log file for the RDF system) indicating the MAT position of the last audit image record stored to disk (730).

However, if any of the Updaters fail before setting their Takeover_Completed flag, the Receiver will detect this and will generate a corresponding RDF takeover failure log message, in which case the system's operator will need to re-execute the RDF takeover command.

CopyAudit Procedure

Referring to FIGS. 15A, 15B, 16A, and 16B, the purpose of the CopyAudit procedure is to copy, for each image trail, all image trail records in a specified system \X not found in the image trail of the target system \Y. However, this seemingly simple operation is more complex than first meets the eye, because:

- it is important to retain accurate MIT position information in the copied image trail data;
- the copy operation relies on information stored in the Image Trail context records to make the copy operation fast and efficient;
- the copy operation makes use of information in the image trail block headers to locate efficiently the first record to be copied in each image trail;
- the copy operation must move audit image records to correct locations in the target system;
- the need to correct Updater context information using information in the Exceptions files so as to back up the Updaters to the proper point for applying audit image records that they were previously unable to apply to the backup database (because the status of those transactions were unknown); and
- the need to use the control point information in the Updater context records to determine when to suppress errors resulting from reapplying audit image records previously applied to the backup database and when to stop suppressing those errors.

In a preferred embodiment, image trail records are stored in each image trail file as a sequence of 4 kb blocks. Each block begins with a block header 394 that includes:

- the block's file storage location consisting of the relative byte address (rba) of the beginning of the block with respect to the beginning of the image trial file;
- a Master image trail (MIT) position indicator, indicating the location of the MIT block in which the Receiver last wrote a commit/abort record before any audit records were stored in the current image trail block;
- a pointer to the first audit image record, if any, whose beginning is located in the block (i.e., in most circumstances the first data to appear in the block header will be the remainder of an audit image record that started in a previous block); and
- the MAT position of the audit image record at the beginning of the buffer block (which will usually begins in an earlier block).

However, the image trail records in systems \X and \Y may not be in identical file positions, or even in files with identical sequence numbers. Therefore, as image trail records are copied from one system to another, the block header information for each new block in the receiving system will need to be corrected or replaced with values accurate for the receiving system. In particular, it is important to store accurate MIT position values in the block headers so that the Receiver knows what transaction data can be deleted from the transaction status table.

The preferred embodiment of the present invention uses an image trail copying methodology that minimizes the complexity of generating the correct block position and MIT position values in the block headers of blocks containing data copied from another system. For reasons that will be explained below, the CopyAudit procedure first copies any image trail records in the MIT of the \X system not found in the local system's MIT (740), and then performs the same operation for each of the other image trails (742). The difference in the file sequence numbers (denoted as File# below and in the Figures) between the file from which the data is being copied and the file in which the copied data is being stored is retained for later use, and is herein called ΔFile (ΔFileMIT for the master image trail). In virtually all cases, ΔFile is equal to 1 because the positions of image records in the image trail files of the parallel systems will usually be very similar, even if they are not identical.

After all the missing audit image records for an image trail have been copied, the context records for the affected image trail and Updaters are updated and durably stored. In particular, the image trail context record is updated to indicate the new EOF (end of file) position for the image trail. For each Updater associated with that image trail, if there are any records in the Updater's Exceptions file, then the Updater's Restart image trail position and Restart MIT position are reset to the values stored in the first item in the Updater's Exceptions file. In this way the CopyAudit procedure guarantees that no audit image record will be mistakenly missed or not applied when the RDF Takeover operation is performed a second time.

In addition, the takeover completed flag (574C, FIG. 9) for each affected Updater is turned off, so as to enable the Updater to process more audit image records during the subsequent RDF takeover operation, and the crash recovery flag (574D, FIG. 9) is set for each affected Updater, for a purpose that is described below (742).

When the CopyAudit procedure has completed copying all missing audit image records to the local image trails, the context record for the Receiver is updated by clearing the takeover completed flag and durably storing the context record (744). As indicated above, the CopyAudit procedure must be executed on all the backup systems other than the one with the most audit information. Then all the backup systems that received any copied audit information need to re-execute the RDF Takeover procedure so as to process the copied audit information (see step 706, FIG. 13).

The second execution of the RDF Takeover procedure also processes audit information previously received but for which commit/abort information was not previously available until the copied audit information was received. By backing up each Updater's Restart position, the Updaters are given a second chance to apply audit to the backup database for which transaction status information was unavailable before the CopyAudit operation. If the copied audit information includes the previously missing status information, then those audit records are applied to the backup database during the second execution of the RDF Takeover procedure.

Figure 16A:
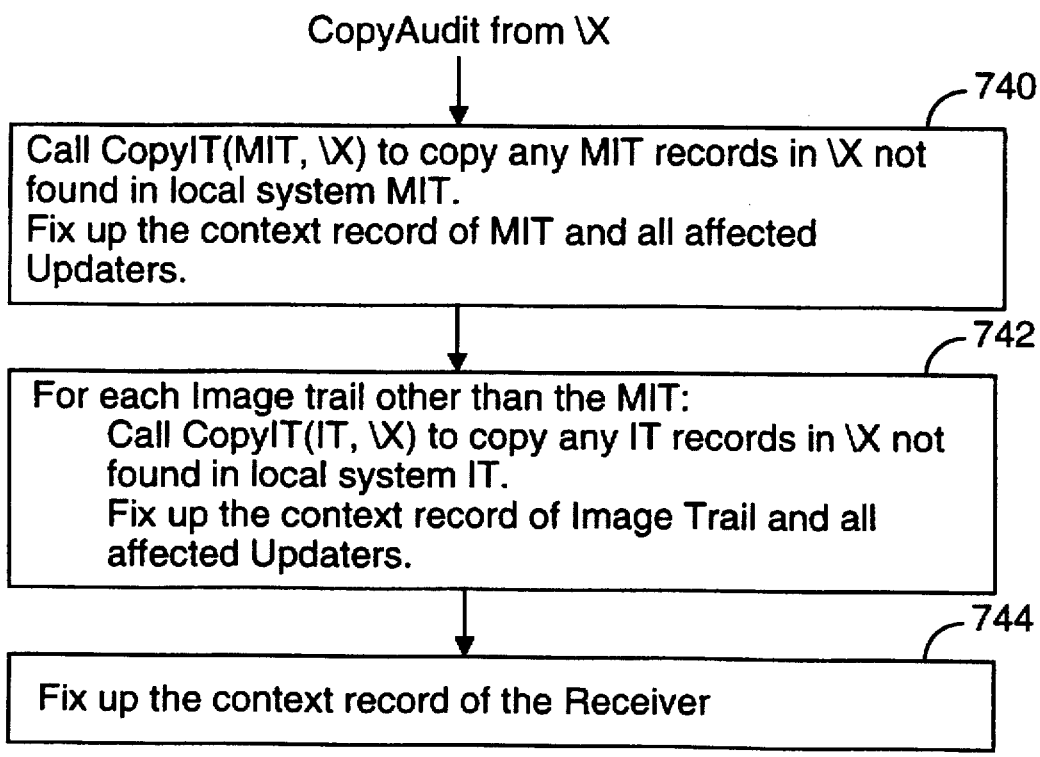
FIGS. 16A and 16B depict flow charts of the CopyAudit procedure used in a preferred embodiment of the present invention.
Figure 16B:
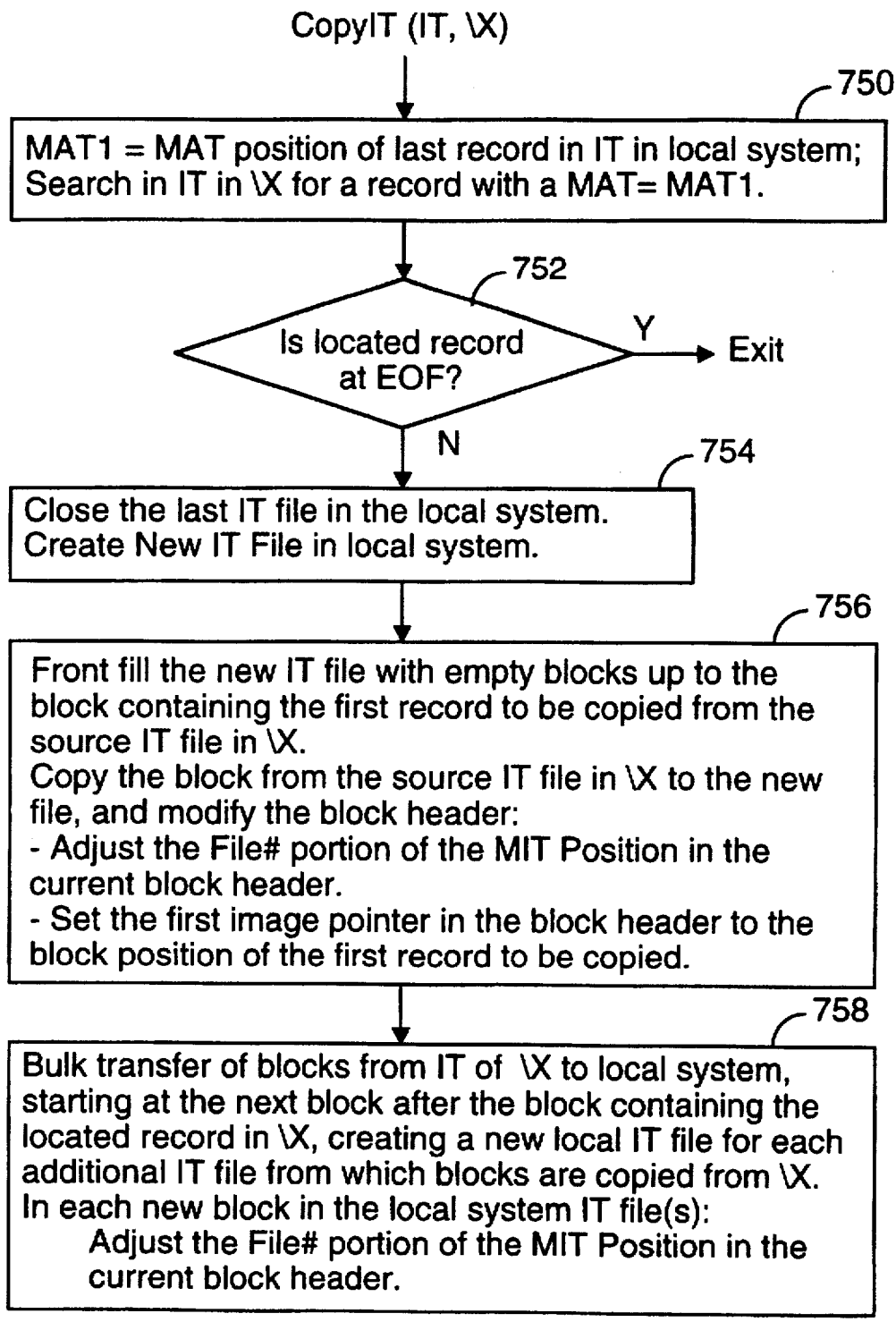

Referring to FIGS. 16B and FIG. 15A, the procedure in a preferred embodiment for copying image trail data for any one image trail is as follows. The MAT position of the last record in the selected image trail in the local system is determined and saved in a local variable, MAT1. Then, the procedure searches in the corresponding image trail in the \X system for a record with a MAT position equal to MAT1 (750).

The search for a record with MAT=MAT1 has three phases: a file identification search, a pseudo-binary block identification search, and a image record location search. The file identification search is performed by scanning the MAT position field in the block headers of the first block in each image trail file for the subject image trail. This block header field indicates the MAT position of the image trail record at the very beginning of each file. The image trail files can be scanned in this manner, either in oldest to newest order, or in newest to oldest order, until the file(s) in which the record with MAT=MAT1 is located, completing the first phase of the search.

If the record with MAT=MAT1 is found to span two files, then the second phase of the search is skipped, because the block for starting the third phase search is the first block of the second of the two files located in the first phase of the search.

In the second phase of the search, a pseudo-binary search of the block headers in the identified file is made. In particular, the search procedure finds the block header closest to the middle of the file, inspects the MAT position in the block header, and determines which half of the file the record with MAT=MAT1 is located in. Then a block header is located near the middle of the remaining portion of the file to determine which half of that portion contains the record with MAT=MAT1. This pseudo-binary searching continues until a block having a least a portion of the record with MAT=MAT1 is located, and then that block is selected as the starting point for the third phase of the search.

The third phase of the search is a simple linear search, starting with the block identified in the first or second phases, until the first record with a MAT greater than MAT1 is located. This located record is the first record to be copied to the receiving system. The image trail file associated with this located record is called the first "source image trail file".

If the record with MAT=MAT1 located in the second phase of the search is the last record in the image trail (752), then there are no audit image records to be copied between the two systems for this image trail, and the procedure exits for this particular image trail.

Otherwise (752-N), the last file in the image trail of the local system is closed and a new image trail file is created on the local system. Steps 754 and 756 perform all the initial steps required to begin copying image trail records from the first source image trail file in \X to new image trail files in the \Y system.

Every new image trail is automatically assigned a name such as $IMAGE2.A2.AA000012, where the first part of the file pathname identifies the image trail associated with the new file, the middle part identifies the control subvolume, and the last part of the file pathname is a sequence number that is automatically incremented each time a new file is created for that image trail. A local variable called ΔFile is set equal to the difference between the sequence number of the new image trial file just created and the sequence number of the file associated with the first record to be copied from the \X system (754). In the example shown in FIG. 15A, ΔFile is equal to 1. When the image trail being adjusted is the master image trail, a local variable called ΔFileMIT is set equal to ΔFile. As indicated above, ΔFile will almost always be equal to 1 for all image trials.

The first new image trail file for each image trail is filed with empty 4K blocks (with the header indicating the block has no data) up to block containing the first record to be copied from the first source image trail file in the \X system. For example, if the record having a MAT equal to MAT1 in the first source image trail file is located in the $23^{rd}$ block at a block offset position of 1000 bytes, then 22 empty blocks will be generated at the beginning of the new image trail file, and the 23rd block is copied from the source image trail file. The File# portion of the MIT location in the current block header is adjusted by adding ΔFileMIT to it, and the First Image Pointer of the current block header is set to the location in the block of the "first record to be copied" (756). By so setting the First Image Pointer, all previous audit image records in this block will be ignored by the Updater(s) reading this image trail file.

Next (step 758), all image trail blocks after the first copied block, to the end of the image trail in \X, are copied to the local system. Preferably, large bulk transfers (e.g., 28K each) for transferring multiple blocks at a time are used for this copying operation. As the end of each image trail file is reached, a new image trail file is created on the local system for each additional source image trail file from which records are copied. Furthermore, for each new block of image trail data copied to the local system the block header adjusted as follows: the File# portion of the MIT location in the current block header is adjusted by adding ΔFileMIT to it. The reason such simple adjustments are sufficient to correct the block header of each new block is the way copied image trail records are copied to new image trail files, which automatically preserves the relationship between each image trail block and the corresponding MIT block in the source system. Preserving the relationship between image trail blocks and MIT blocks is required to avoid premature deletion of transaction status information from the transaction status table, which is essential to proper operation of the Updaters.

Note that since an Updater's context records have been adjusted to reapply audit image records not previously applied, the crash recovery flag for that Updater is set. Whenever the Updater is restarted, after the CopyAudit operation, by the second execution of the RDF Takeover command, the crash recovery flag will cause the Updater to suppress the generation of error messages when audit records that may have been applied previously are reapplied against the backup database. For example, if a database record was previously inserted or deleted when an image trail record was applied a first time, an error will be generated when the Updater attempts to reapply that same image trail record to the backup database, but the Updater will suppress the reporting of that error because the Updater knows that it is reapplying previously applied audit image records. The Updater stops suppressing such error messages when the first flush control point after the flush control point referenced in the Updater's context record is reached.

Detailed Explanation of Stop Updaters at Timestamp Procedure

As mentioned earlier, if the primary system is in active use and the Updaters are active on a backup system, the data volumes on the backup system will not be in a completely consistent state because some transactions may have been partially stored to disk. Because the Updaters operate asynchronously with respect to each other, some Updaters may have already applied audit associated with some transactions, while other Updaters have not yet processed audit associated with that same set of transactions. While this "inconsistent state" problem is of no consequence for most casual database inquiries (e.g., a "browsing" or "read only" query about the number of seats available on a particular airplane flight), it is intolerable for tasks that require consistent or stable access, such as generating monthly reports and other important management data summaries that must be totally internally consistent.

As explained above in the "Background of the Invention" section of this document, prior to the present invention the only way to bring the backup database to a consistent state required all applications on the primary system to be stopped, sometimes for a substantial period of time. By way of contrast, the present invention brings the backup database to a consistent state without affecting the primary system's operation in any way.

In a preferred embodiment, a Stop Updaters at Timestamp procedure, shown in FIGS. 17A and 17B, is provided. This procedure begins by sending a "Stop Updaters at timestamp" message to all Updaters with the operator specified timestamp as a parameter (770). Each Updater responds to this message by storing the specified Stop Timestamp in local memory. Whenever the Stop Timestamp value is non-zero, the Updater will check the commit timestamp of every committed transaction before applying that transaction's audit image records to the backup database.

More specifically, a non-zero Stop Timestamp value causes the Updater to continue applying the updates defined by each image trail record to the backup database, but only if the associated transaction committed before the Stop Timestamp. The first time that an update is not applied to the backup database because the associated transaction committed at or after the Stop Timestamp, a pointer to the audit image record is stored in the Updater context record as the Timestamp-based Restart Position, and the context record is durably stored. This is done only for the first audit image record that is not applied.

The operation of the Updater, while the Stop Timestamp value is non-zero, will next be explained with reference to the hypothetical sequence of image trail records and associated commit/abort records shown in Table 1. The Stop Timestamp value in this example is 12:00:00 (in real applications the stop timestamp would include a date). The left column represents database updates by the letter T followed by a one digit transaction identifier, and represents the associated commit records by the letter C followed by a one digit transaction identifier. For the purposes of this example, it will be assumed that all the database updates listed in Table 1 are for one particular protected volume (and thus are to be applied by just one Updater).

By definition, each transaction consists of one or more database update events followed by a commit or abort event. Thus, the commit or abort audit record for a transaction is by definition the last audit record generated for a transaction.

TABLE 1

Hypothetical Sequence of Image Trail Records Shipped by Extractor to Receiver

| Tx Event | RTD Timestamp | Commit/Abort Timestamp |
|---|---|---|
| C0 | 11:58 | 11:58 |
| T1 | 11:58 | |
| T2 | 11:58 | |
| T1 | 11:58 | |
| T2 | 11:58 | |
| T3 | 11:58 | |
| C1 | 11:59 | 11:59 |
| T4 | 11:59 | |
| C3 | 12:00 | 12:00 |
| T2 | 12:00 | |
| A4 | 12:00 | 12:00 |
| C2 | 12:01 | 12:01 |
| C5 | 12:02 | 12:02 |

The Updater will process all database updates for transaction 0 (which occur before the items in Table 1), because it commits at 11:58, before the Stop Timestamp.

The next database update, labeled T1, is for transaction 1 and has a RTD timestamp of 11:58. Since transaction 1 commits at 11:59 (see the C1 image trail record), the Updater applies this database update to the backup database. The next database update after that is labeled T2 and has a RTD timestamp of 11:58. However, since transaction 2 commits at 12:00 (see the C2 image trail record), which is not before the Stop Timestamp, the Updater does not apply this database update to the backup database. Since this is the first image trail record not applied to the backup database, the Updater will set its Timestamp-based Restart IT pointer to point to this T2 image trail record, and will set its Timestamp-based Restart MIT pointer to point to the corresponding MIT block so that it can try again to apply this database update when the Updater is restarted at a later time.

The next T1 update is applied to the backup database, but the T2 and T3 updates are not applied to the backup database because their transactions are committed at or after the Stop Timestamp.

The T4 record with an 11:59 Timestamp is not applied to the backup database because that transaction is aborted (see the A4 record). Because the Updater reads only database update records and does not read commit/abort records, the next record the Updater will read after the T4 record is the T2 record.

The T2 record (following the T4 record) with a 12:00 RTD Timestamp is the last audit image record processed by the Updater. After reading this T2 record with an RTD Timestamp at or after the Stop Timestamp, it is guaranteed that there are no additional image records for transactions that committed before the Stop Timestamp (since the commit Timestamp of a transaction is always later than the transaction's last database update). Therefore the Updater shuts down upon reading any image trail record with an RTD Timestamp at or after the Stop Timestamp.

More specifically, the first time the Updater reads an audit image record having an RTD Timestamp at or after the Stop Timestamp, the following set of actions are preformed:

- the crash recovery flag (574D, FIG. 9) in the Updater's context record is set (to suppress the generation of error messages when audit records are reapplied against the backup database when the Updaters are started up again);
- the restart IT position (571, FIG. 9) in the Updater's context record is set to Timestamp-based restart IT position (574A, FIG. 9);
- the restart MIT position (572, FIG. 9) in the Updater's context record is set to Timestamp-based restart MIT position (574B, FIG. 9);
- an Updater shutdown log message is generated and stored in the RDF log file, indicating that the Updater stopped after processing all records for transactions that committed before the Stop Timestamp;
- the Updater's context record is durably stored; and
- the Updater process terminates.

Note that the Stop Updaters at Timestamp procedure only causes the Updaters to stop, while the Extractor and Receiver continue to process audit information. Also, by saving the Timestamp-based Restart IT and MIT positions in the Updater context record for the first audit image record not applied, and then copying them to the Restart IT and MIT positions in the Updater context record just before terminating the Updater processes, the Updater procedure guarantees that no image audit records will be missed by the Updaters as the result of a Stop Updaters at Timestamp operation. The Stop Updaters at Timestamp operation leaves the Updaters ready to start processing all audit image records not applied to the backup database before the Updaters shut down.

Receiver and Updater Restart

Figure 18A:
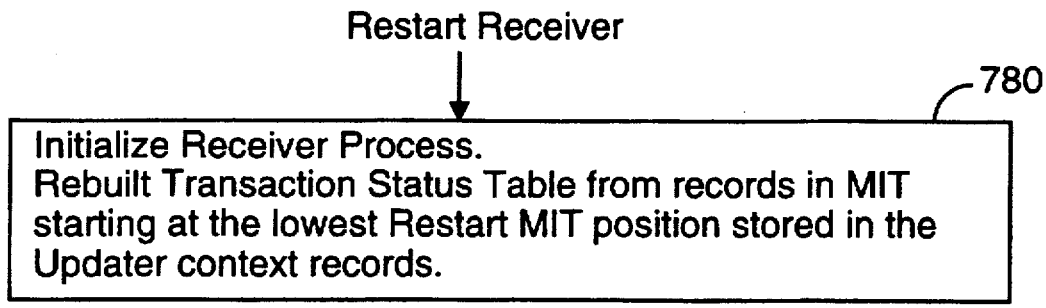
FIGS. 18A and 18B depicts flow charts of the Restart Receiver and Restart Update procedures used in a preferred embodiment of the present invention.

Referring to FIG. 18A, whenever the Receiver process is restarted, such as after a system failure, and RDF shutdown or an RDF Takeover, the Receiver process is initialized and the transaction status table is rebuilt from records in the master image trail (MIT), starting at the lowest Restart MIT position stored in the Updater context records (780). After a full RDF shutdown the Receiver process is always restarted before the Updaters are restarted.

Figure 18B:
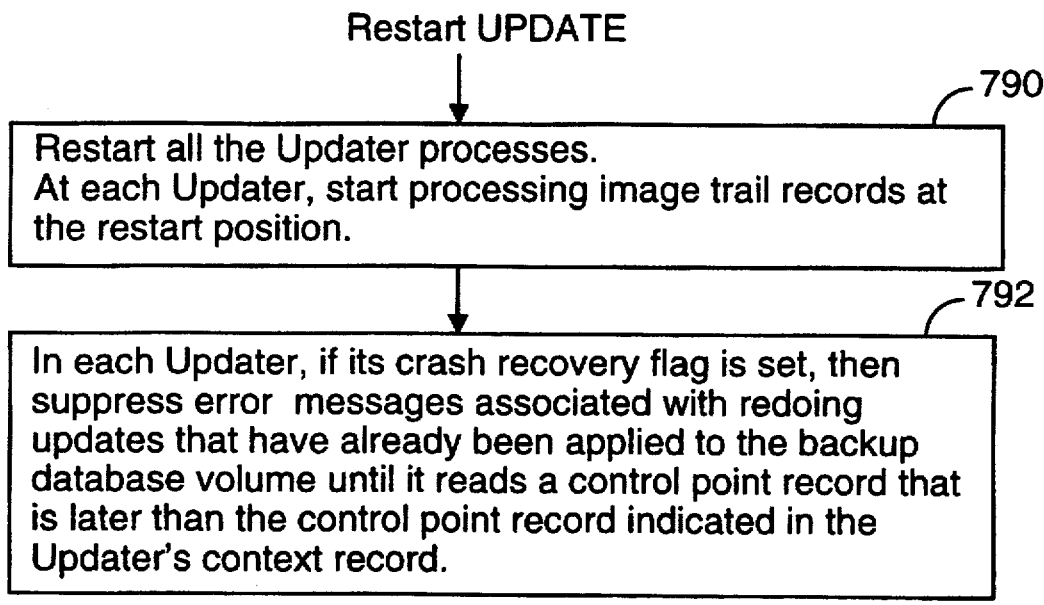

Referring to FIG. 18B, each time the Updaters in a backup system are restarted, such as after performing a Stop RDF, Stop Updaters at Timestamp, or an RDF Takeover, each Updater process is initialized and starts processing image trail records at the record indicated by the Restart Image Trail Position (571, FIG. 9) in the Updater's context record (790).

If the crash recovery flag is set, then the Updater suppresses the generation of error messages associated with redoing updates that may have already been applied to the backup database until it reads a flush control point record whose MAT position is greater than the MAT position of the flush control point record indicated (574E, FIG. 9) in the Updater's context record (792). Also, the crash recovery flag is reset when the Updater reads a flush control point record that is later than the control point record indicated (574E, FIG. 9) in the Updater's context record (792).

Alternate Embodiments

In alternate embodiment, different data structures and different procedural organizations could be used while still utilizing the key features of the present invention. For instance, in an alternate embodiment an audit copying procedure (see FIGS. 15A, 15B, 16A, 16B) could copy data from the source system to the receiving system without copying image trail records to the same image trail file positions as those in the source system. In such an alternate embodiment, the job of updating the block headers to reflect properly the block position and MIT block position for each copied block of data would be more complex than in the preferred embodiment.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A distributed computer database system, comprising:
   a local computer system having a local database stored on local memory media, application programs that modify the local database, and a transaction manager that stores audit records in a master audit trail (MAT) reflecting those application program modifications to the local database; the audit records in the MAT including A) commit/abort records each having transaction identifier, a transaction commit/abort status indicator, and a commit/abort timestamp indicating when a transaction associated with the transaction identifier committed or aborted, and B) database update records each having a transaction identifier and database modification information;
   a remote computer system, remotely located from the local computer system, the remote computer system having a backup database stored on memory media associated with the remote computer system;
   a communication channel for sending messages between the local computer system and the remote computer system;
   a remote data duplication facility (RDF), partially located on the local computer system and partially located on the remote computer system, for maintaining virtual synchronization of the backup database with the local database, the remote data duplication facility (RDF) including:

an Extractor process executed by the local computer system that extracts audit records from the MAT, constructs a corresponding stream of image records by adding supplemental information to at least some of the audit records, the added information including an image record timestamp, and transmits the stream of image records to the remote computer system; the image records including commit/abort image records and database update image records;

a Receiver process executed by the respective remote computer system that receives the image records transmitted by the Extractor process, and distributes the received image records to one or more image trails in the respective remote computer system; and one or more Updater processes executed by the respective remote computer system, wherein each Updater process reads the image records in an assigned one of the image trails and applies at least a subset of the read image records against the backup database by initiating redo operations of the database modifications denoted the subset of the read image records against the backup database;

wherein each Updater process includes Stop Updaters at Timestamp instructions for preventing the Updater from applying against the backup database those of the read database update image records whose transaction ID matches the transaction ID in a corresponding commit/abort image record having a commit/abort timestamp whose value is not earlier than a specified Stop Timestamp.

2. A system as in claim 1, wherein the Stop Updaters at Timestamp instructions include instructions for shutting down each Updater when it first reads a database update image record whose image record timestamp is not earlier than the specified Stop Timestamp.

3. A system as in claim 2, wherein the Stop Updaters at Timestamp instructions include instructions for durably storing a Restart image trail position comprising a pointer to a first database update image record read by the respective Updater process having image record timestamp that is not earlier than the specified Stop Timestamp, each Updater processing including instructions for reading image trail records beginning at the Restart image trail position whenever the Updater process is restarted, whereby database update image records whose application to the backup database was prevented by the Stop Updaters at Timestamp instructions are applied to the backup database whenever the Updater process is restarted.

4. A system as in claim 3, wherein the Stop Updaters at Timestamp instructions include instructions for setting and durably storing a crash recovery flag in each Updater process for shutting down the Updater process, each Updater processing including crash recovery instructions, responsive to the crash recovery flag for the Updater process being set, for suppressing error messages that would otherwise be generated when database updates already applied to the backup database are applied to the backup database a second time.

* * * * *

UNITED STATES PATENT AND TRADEMARK OFFICE
CERTIFICATE OF CORRECTION

PATENT NO. : 5,799,322  
DATED : August 25, 1998  
INVENTOR(S) : Malclm Mosher, Jr.

It is certified that error appears in the above-identified patent and that said Letters Patent is hereby corrected as shown below:

Column 8,
Line 61, after "Updater." begin a new paragraph

Column 9,
Line 25, after the first occurrence of "of" insert -- the --

Column 11,
Line 23, after "$SYSTEM.A2.config." begin a new paragraph

Column 14,
Line 54, delete "begins" and insert therefor -- begin --

Column 20,
Line 19, replace the first occurrence of "is" with -- if --

Column 25,
Line 62, after first occurrence of "some" insert -- of --

Column 30,
Line 17, after "having" delete "a" and insert therefor -- at --
Line 54, after the first occurrence of "to" insert -- the --

Column 34,
Line 52, after "having" insert -- a --

Signed and Sealed this

Thirty-first Day of May, 2005

JON W. DUDAS  
*Director of the United States Patent and Trademark Office*